(12) United States Patent
Chavarria et al.

(10) Patent No.: US 6,993,433 B2
(45) Date of Patent: Jan. 31, 2006

(54) MODELING GRAVITY AND TENSOR GRAVITY DATA USING POISSON'S EQUATION FOR AIRBORNE, SURFACE AND BOREHOLE APPLICATIONS

(75) Inventors: Juan Andres Chavarria, Durham, NC (US); Partha Sarathi Routh, Boise, ID (US); Jerry Lee Kisabeth, Ponca City, OK (US); Gregory Joseph Jorgensen, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 199 days.

(21) Appl. No.: 10/681,646

(22) Filed: Oct. 8, 2003

(65) Prior Publication Data

US 2004/0172199 A1 Sep. 2, 2004

Related U.S. Application Data

(63) Continuation-in-part of application No. 10/236,204, filed on Sep. 6, 2002, now Pat. No. 6,675,097, which is a continuation-in-part of application No. 09/580,863, filed on May 30, 2000, now Pat. No. 6,502,037, and a continuation-in-part of application No. 09/405,850, filed on Sep. 24, 1999, now Pat. No. 6,430,507, and a continuation-in-part of application No. 09/399,218, filed on Sep. 17, 1999, now Pat. No. 6,424,918, which is a continuation-in-part of application No. 09/285,570, filed on Apr. 2, 1999, now Pat. No. 6,278,948.

(60) Provisional application No. 60/318,083, filed on Sep. 7, 2001.

(51) Int. Cl.
*G06F 17/50* (2006.01)

(52) U.S. Cl. .............................................. 702/14; 703/5

(58) Field of Classification Search .................. 702/14, 702/11, 12; 367/73, 31; 73/152.17; 703/5, 703/10; 250/256

See application file for complete search history.

(56) References Cited

U.S. PATENT DOCUMENTS

| 4,964,103 A | 10/1990 | Johnson | 367/53 |
| 4,987,561 A | 1/1991 | Bell | 367/53 |

(Continued)

OTHER PUBLICATIONS

Routh, Partha S.; et al.; *Base of the Salt Imaging Using Gravity and Tensor Gravity Data*, 71st Ann. Internat. Mtg.: Soc. of Expl. Geophys., pp. 1482–1484, 2 Figs.

(Continued)

*Primary Examiner*—John Barlow
*Assistant Examiner*—Victor J. Taylor
(74) *Attorney, Agent, or Firm*—Madan Mossman & Sriram PC

(57) ABSTRACT

The present invention is a method for determining a parameter of interest of a region of interest of the earth. At least one component of potential fields data is measured at a plurality of locations over a region of interest including a subterranean formation of interest. The potential fields data are selected from magnetic data and gravity data. An initial geophysical model is determined for the region including the subterranean formation of interest. For the model, geophysical tensor data is updated using a forward model at a plurality of locations using a High Order Compact Finite Difference method. A difference between the estimated model value and the measured value of the potential field measurements are determined, and the geophysical model is updated. The model is iteratively updated and compared to the measured data until the differences reach an acceptable level and the parameter of interest has been determined.

20 Claims, 15 Drawing Sheets

(5 of 15 Drawing Sheet(s) Filed in Color)

U.S. PATENT DOCUMENTS

| | | | | |
|---|---|---|---|---|
| 5,200,929 | A | | 4/1993 | Bowers ........................ 367/38 |
| 5,576,485 | A | * | 11/1996 | Serata ..................... 73/152.17 |
| 5,583,825 | A | * | 12/1996 | Carrazzone et al. .......... 367/31 |
| 5,675,147 | A | * | 10/1997 | Ekstrom et al. ............ 250/256 |
| 5,678,643 | A | | 10/1997 | Robbins et al. ............... 175/45 |
| 5,729,451 | A | * | 3/1998 | Gibbs et al. .................. 702/12 |
| 5,889,729 | A | | 3/1999 | Frenkel et al. ................ 367/73 |
| 6,125,698 | A | | 10/2000 | Schweitzer et al. ....... 73/382 G |
| 6,278,948 | B1 | | 8/2001 | Jorgensen et al. ............. 702/6 |
| 6,424,918 | B1 | | 7/2002 | Jorgensen et al. ............. 702/6 |
| 6,430,507 | B1 | | 8/2002 | Jorgensen et al. ............. 702/6 |
| 6,502,037 | B1 | | 12/2002 | Jorgensen et al. ........... 702/14 |
| 6,606,586 | B1 | * | 8/2003 | Ishikawa ....................... 703/5 |
| 6,718,291 | B1 | * | 4/2004 | Shapiro et al. ................ 703/2 |

OTHER PUBLICATIONS

Jorgensen, Greg J. et al.; *Joint 3–D Inversion of Gravity, Magnetic and Tensor Gravity Fields for Imaging Salt Formations in the Deepwater Gulf of Mexico*, 70th Ann. Internat. Mtg.: Soc. of Expl. Geophys., pp. 424–426.

Margaret H. Wright; *Interior Methods for Constrained Optimization*, Acta Numerica, vol. 1, Cambridge University Press, 1992, pp. 341–407.

Spotz, W.F.;*A High–Order Compact Formulation for the 3D Poisson Equation Numerical Methods for Partial Differential Equations*, 12, 1996 pp. 235–243, 4 Figs.

*Calculation of Weights in Finite Difference Formulas*, SIAM Rev., vol. 40, No. 3, Sep. 1998, pp. 685–691.

Gupta, Murli M. et al.; *Symbolic Derivation of Finite Difference Approximations for the Three–Dimensional Poisson Equation*, Numerical Methods for Partial Differential Equations, vol. 14, No. 5, Sep. 1998, pp. 593–606, 1 Table.

Yishi, L. et al., "Simultaneous Inversion of Gravimetric and Magnetic Data Constrained With Internal Correspondence Analysis and its Application to the Tarim Basin," Seismology and Geology, vol. 18, No. 4, pp 361–368 (Dec. 1996)—Abstract only presented in English.

Xichen, W., "The Research on Generalizeal Joint Inversion Method Used to Inverse Magnetic and Density Interface," Jnl of Changchun University of Earth Science (1990)—Abstract only presented in English.

Rongchang, J., "Normalized Solution of Linear Equation System With Applications," Geophysical Prospecting For Petroleum, vol. 31, No. 2, pp. 38–46 (Jun. 1992)—Abstract only presented in English.

Wen–Cai, Y. et al., "Velocity Imaging From Reflection Seismic Data by Joint Inversion Techniques," Acta Geophysica Sinica, vol. 30, No. 6, pp. 617–627 (Nov. 1987)—Abstract only presented in English.

Zhaoqin, M., "Optimal filtering method for separating off gravity anomalies," OGP, 1997 32(3), pp. 376–386—Abstract only presented in English.

Xiwen, W., "Direct hydrocarbon prediction using joint inversion of gravimetric and seismic data," OGP, 1997, 32(2), pp. 221–228—Abstract only presented in English.

Rui, F. et al., "A Non–Block Consistent Model in Seismo-Gravity Inversion," Acta Geophysica Sinica, vol. 36, No. 4, pp. 463–475 (Jul. 1993)—Abstract only presented in English.

Xiaoping, M. et al., "Gravity inversion using weight–smoothed boundary element method," OGP, 1995, 30(4), pp. 523–532—Abstract only presented in English.

Bell, R., Full Tensor Gradiometry: 3–D Tool for the Next Century, pp. 190–193 and drawings (date and publication unknown).

Pratson, L.R. et al., "A High Resolution 3–D Marine Gravity Gradiometry Survey over a Gulf of Mexico Deepwater Subsalt Prospect in the Mississippi Canyon Area," (Apr. 1994)—Abstract.

Egorova, T.P., "Preliminary 3–D Density Model for the Lithosphere of Dnieper–Donets Basin on the Basis of Gravity and Seismic Data," pp. 191–193 (date and publication unknown).

Dransfield, M.H., "Invariments of the Gravity Gradient Tensor for Exploration Geophysics," CRA Exploration, Abstract G–12B–3.

Kaufmann, R. et al., "Joint Tomographic Inversion of Travel–Time Residuals and Gravity Anomalies for Crustal Velocity Structure in Southeast Tennessee," School of Earth and Atmospheric Sciences, Abstract S41A–4.

Mickus, K. et al., "Gravity Gradient Tensor Analysis of the Arkoma Basin and Ouachita Mountains, Ark. And Ok.," Abstract T11B–13.

Bocchio, F., "A <Tidal> Magnetic Field?," Annali Di Geofisica., vol. XL, No. 5, pp. 1029–1032 (Oct. 1997).

Zadro, Maria et al., "Spectral methods in gravity inversion: the geopotential field and its derivatives," pp. 1433–1443 (date and publication unknown).

Bocchio, F., "Research Note: on some implications of the Poisson relation," Geophys. J. Int. (1998) 133, 207–08.

Pulliam, R. Jay et al., "Seismic theory, inversion and resolution," Seismological Research Letters, vol. 62, No. 1, (Jan.–Mar., 1991), p. 19.

Geophysics, Session 112, Oct. 30, 1996 (CCC:C109) Abstract pp. A–283–284.

Murthy, I.V.R. et al., "Gravity Anomalies of a Vertical Cylinder of Polygonal Cross–Section and Their Inversion," Computers & Geosciences, vol. 22, No. 6 pp. 625–630 (1996).

Zheng, Y. et al., "Joint inversion of gravity and magnetic anomalies of eastern Canada," Can. J. Earth Sci., 35: 832–53 (1998).

Chamot–Rooke N., et al., "Constraints on Moho Depth and Crustal Thickness in the Liguro–Provencal Basin from a 3D Gravity Inversion: Geodynamic Implications," Revue de L'Institut Francais Du Petrole, vol. 52, No. 6 Nov.–Dec. 1997 pp. 557–583.

Association Round Table pp. 1925–1926 (date unknown).

Bowin, C. et al., "Depth estimates from ratios of gravity, geoid, and gravity gradient anomalies," Geophysics, vol. 51, No. 1 (Jan. 1986), pp. 123–136, 12 Figs, 2 Tables.

Hansen, R., "Euler Deconvolution and Its Generalizations," pp. 1–8 (date unknown).

Jacobsen, B., "A case for upward continuation as a standard separation filter for potential–field maps," Geophysics, vol. 52, No. 8 (Aug. 1987), pp. 1138–1148, 10 Figs.

Vasco, D.W., "Groups, algebras, and the non–linearity of geophysical inverse problems," Geophys. J. Int. (1997), 131, pp. 9–23.

Ates, A., et al., "Geophysical investigations of the deep structure of the Aydin–Milas region, southwest Turkey: Evidence for the possible extension of the Hellenic Arc," Isr. J. Earth Sci.: 46: pp. 29–40 (1997).

Doering, J. et al., "Gravity Modeling in the Southern Urals," Abstract, Geophysics/Tectonophysics (Posters) Session 159 (Oct. 1996).

Opfer, R.R., "Synthetic Gravity Modelling—An Interpretation Tool to Integrate Seismic and Gravity Data," P140 EAEG—55$^{th}$ Mtg and Technical Exhibition (Jun. 1993).

Papp, G., "Trend Models in the Least–Squares Prediction of Free–Air Gravity Anomalies," Periodica Polytechnica Ser. Civil. Engl., vol. 37, No. 2, pp. 109–130 (1993).

Sumanovac, F., et al., "System Architecture for 3D Gravity Modelling," Geol. Croat. 49/2 pp. 145–153, 12 Figs. (1996).

Danchiv, D. et al., "Computation of Gravity Gradient Tensor in a Rectangular System of Prisms for Vrancea Zone, Galati–Focsani Alignment," Int'l Geophysical Symposium, p. 99 (date unknown).

Henke, C.H. et al., "Interactive three–dimensional gravity inversion and forward modeling using a visualization system," Hamburg, University, Germany, pp. 430–431 (date unknown).

Anderson, R.N., 1998 Annual Meeting Abstract No. 27, "Future Technologies—A Far–Field Industry Review," AAPG Annual Meeting (May, 1998).

Abdelrahman, E.M. et al., "Depth determination for buried spherical and horizontal cylindrical bodies: an iterative approach using moving average residual gravity anomalies," J. Univ Kuwait (Sci.) 22 pp. 114–121 (1995).

Fairhead, J.D. et al., "Application of Semi–Automated Interpretation Methods in Western Siberia and Southern Sudan," EAEG 56$^{th}$ Meeting and Technical Exhibition, 1037 (Jun. 1994).

Casas, A. et al., "An Interactive 2D and 3D Gravity Modelling Programme for IBM–Compatible Personal Computers," EAGE 58$^{th}$ Conference and Technical Exhibition, P184 (Jun. 1996).

Olesen, Odleiv, "Application of the Potential Field Methods to the Study of the Lofoten–Lopphavet Area, Northern Norway," EAEG 56$^{th}$ Meeting and Technical Exhibition, 1034 (Jun. 1994).

Henke, C.H. et al., "Geomaster—A Programme for Interactive 3D Gravity Inversion and Forward Modelling," EAGE 57$^{th}$ Conference and Technical Exhibition, P145 (Jun. 1995).

Stiopol, D. et al., "Gravity and Magnetics Studies in the Vrancea Zone of Romania," EAGE 58$^{th}$ Conference and Technical Exhibition, M056 (Jun. 1996).

Radhakrishma, M. et al., "Gravity Inversion of Closed Two–Dimensional Bodies," Bollettino Di Geofisica Teorica Ed Applicata, vol. XXXIV, No. 136, pp. 287–296 (Dec. 1992).

Nandi, B.K., et al., "A short note on: Identification of the shape of simple causative sources from gravity data," Geophysical Prospecting, 45, pp. 513–520 (1997).

Silitonga, T.H. et al., "Relation of Reservoir Condition Changes to Precision Gravity Measurement with Contribution 3–D Model in Kamojang Geothermal Field," Proceedings Indonesian Petroleum Association (Oct. 1995).

Schenk, R.L. et al., "Integrated Gravity Modeling of Salt Feature in the Mississippi Salt Basin," Transactions of the Gulf Coast Association of Geological Societies, vol. XLVI (1996).

Abstract Page, EOS, vol. 61, No. 17 (Apr. 1980), p. 300.

Mjelde, R. et al., "Crustal structure of the northern part of the Voring Basin, mid–Norway margin, from wide–angle seismic and gravity data," Tectonophysics 293 (1998) 175–205.

Kilty, K., "Short Note: Werner deconvolution of profile potential field data," Geophysics, vol. 48, No. 2 (Feb. 1983): p. 234–237, 2 Figs, 1 Table.

Coburn, G.W., "Applied Geophysics Report: 3D full tensor gradient method improves subsalt interpretation," Bell Geospace, Inc., (Sep. 1998).

Guspi, F., "Short Note: Three–dimensional Fourier gravity inversion with arbitrary density contrast," Geophysics, vol. 57, No. 1 (Jan. 1992): p. 131–135, 4 Figs.

Garcia–Abdeslem, J., "Short note: Gravitational attraction of a rectangular prism with depth–dependent density," Geophysics, vol. 57, No. 3 (Mar. 1992) p. 470–473, 3 Figs.

Guspi, F., "General 2D gravity inversion with density contrast varying with depth," Geoexploration 26 (1990) 253–265.

Dindi, E.W. et al., "Joint three–dimensional inversion of gravity and magnetic data from Jombo Hill alkaline complex, Kenya," Jnl of Geological Society, vol. 145 (1998) pp. 493–504, 12 Figs. 3 Tables.

Richardson, R.M. et al., "The Inversion of Gravity Data into Three–Dimensional Polyhedral Models," Jnl Geophysical Research, vol. 94, No. B6 pp. 7555–7562 (Jun. 1989).

Prutzman, J., "Cold–War Stealth Science Can Aid Seismic Interpretation," JPT, pp. 56–57 (Jan. 1998).

Lines, L.R. et al., "Tutorial A Review of Least–Squares Inversion and its Application to Geophysical Problems," Geophysical Prospecting 32, 159–186 (1984).

Kwok, Y, "Gravity Gradient Tensors Due to a Polyhedron with Polygonal Facets," Geophysical Prospecting 39, 435–443 (1991).

Kwok, Y., "Singularities in gravity computation for vertical cylinders and prisms," Geophys. J. Int. (1991) 104. 1–10.

Montana, C.J. et al., "Program to Calculate the Gravitational Field and Gravity Gradient Tensor Resulting From a System of Right Rectangular Prisms," Computers & Geosciences, vol. 18, No. 5, pp. 587–602 (1992).

Soler, T., "A matrix representation of the potential second–rank gradient tensor for local modelling," Geophys. J.R. astr. Soc. (1985) 81, 363–379.

Hynes, A., "Gravity, flexure, and the deep structure of the Grenville Front, easter Quebec and Labrador," Can. J. Earth Sci., vol. 31 1001–1011 (1994).

Zeyen, H. et al., "3–D joint inversion of magnetic and gravimetric data with a priori information," Geophys. J. Int. (1993) 112, 224–256.

Mariano, J. et al., "Gravity and magnetic models of the Midcontinent Rift in eastern Lake Superior," Can. J. Earth Sci. vol. 31 (1994) 661–674.

Thomas, M.D. et al., "An interpretation of gravity anomalies over the Midcontinent Rift, Lake Superior, constrained by GLIMPCE seismic and aeromagnetic data," Can. J. Earth Sci. vol. 31 (1994) 682–697.

Murthy, I.V.R. et al., "Gravity Inversion of Horizontal Circular Discs and Vertical Circular Cylinders," Computers & Geosciences vol. 20 No. 5, pp. 821–838 (1994).

Rao, C.V. et al., "Forward Modeling: Gravity Anomalies of Two–Dimensional Bodies of Arbitrary Shape with Hyperbolic and Parabolic Density Functions," Computers & Geosciences vol. 20 No. 5 pp. 873–880 (1994).

Chai, Y. et al., "Gravity inversion of an interface above which the density contrast varies exponentially with depth," Geophysics, vol. 53, No. 6 (Jun. 1988) p. 837–845, 7 Figs. 1 Table.

Hammer, P.T.C. et al., "Gravity inversion using seminorm minimization: Density modeling of Jasper Seamount," Geophysics, vol. 56, No. 1 (Jan. 1991) p. 68–79, 7 Figs.

Holstein, H. et al., "Gravimetric analysis of uniform polyhedra," Geophysics, vol. 61, No. 2 (Mar.–Apr. 1996) p. 357–364, 6 Figs., 5 Tables.

Lee, T. et al., "Inversion modeling of gravity with prismatic mass bodies," Geophysics, vol. 56, No. 9 (Sep. 1991), p. 1365–1376, 7 Figs.

Nekut, A.G., "Borehole gravity gradiometry," Geophysics, vol. 54, No. 2 (Feb. 1989) P. 225–234, 12 Figs.

Pedersen, L.B. et al., "The gradient tensor of potential field anomalies: Some implications on data collection and data processing of maps," Geophysics, vol. 55, No. 12 (Dec. 1990) P. 1558–1566, 6 Figs.

Vasco, D.W. et al., "Inversion of airborne gravity gradient data, southwestern Oklahoma," Geophysics, vol. 56, No. 1 (Jan. 1991) P. 90–101, 9 Figs., 1 Table.

Holliger, K. et al., "A comparison of the Moho interpreted from gravity data and from deep seismic reflection data in the northern North Sea," Geophysical Jnl (1989) 97 pp. 247–258.

Guspi, F., "Short Note: Three–dimensional Fourier gravity inversion with arbitrary density contrast," Geophysics, vol. 57, No. 1 (Jan. 1992) P. 131–135, 4 Figs.

Bulakh, E.G. et al., "Singularity Criteria for Solution of Inverse Gravimetry Problem by the Selection Method," Gaffes. J. 1995, vol. 15, pp. 173–187.

Bulakh, E.G. et al., "Direct and Inverse Gravimetric Problems for a Class of Bodies Approximated by Horizontal Plates," Geophys. J., 1995, vol. 14, pp. 315–330.

Cassano, E. et al., "Gravity and Magnetic Methods in Crustal Exploration," Potential of Deep Seismic Profiling for Hydrocarbon Exploration, Paris 1990, pp. 95–104.

Ceron, F.A. et al., "A Non Linear Iterative Method for the Inversion of Potential Field Data," Rev. Inst. Mex. Petrol., vol. XXIII, No. 3, pp. 22–36 (Jul. 1991)—Abstract only presented in English.

* cited by examiner 301   305

303   307

Integral formulation    Differential formulation

Integral formulation
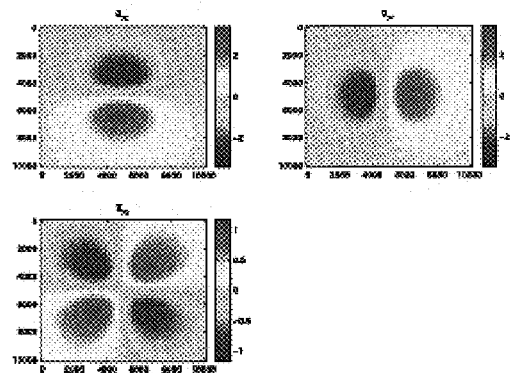
Differential formulation
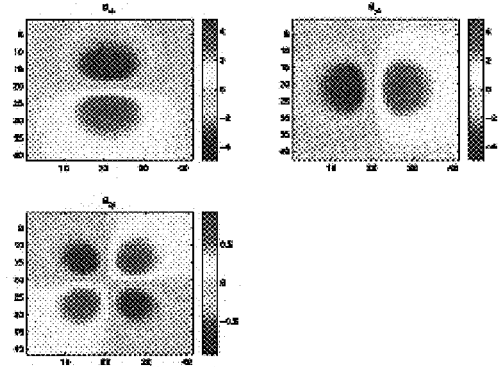
Figure 4C
Figure 4D Finite Difference results:

MODELING GRAVITY AND TENSOR GRAVITY DATA USING POISSON'S EQUATION FOR AIRBORNE, SURFACE AND BOREHOLE APPLICATIONS

CROSS REFERENCE TO RELATED APPLICATIONS

This application is a Continuation-in-Part of U.S. patent App. Ser. No. 10/236,204 filed on Sep. 6, 2002 now U.S. Pat. No. 6,675,097. App. Ser. No. 10/236,204 claims priority from U.S. Provisional App. Ser. No. 60/318,083 filed on Sep. 7, 2001. App. Ser. No. 10/236,204 is a Continuation-in-Part of U.S. patent app. Ser. No. 09/580,863 filed on May 30, 2000, now U.S Pat. 6,502,037. App. Ser. No. 09/580,863 is a Continuation-in-Part of U.S. patent app. Ser. No. 09/285,570 filed on Apr. 2, 1999, now U.S. Pat. No. 6,278,948; app. Ser. No. 09/399,218 filed on Sep. 17, 1999, now U.S. Pat. No. 6,424,918; and U.S. patent app. Ser. No. 09/405,850 filed on Sep. 24, 1999, now U.S. Pat. No. 6,430,507. App. Ser. No. 09/399,218 filed on Sep. 17, 1999, now U.S. Pat. No. 6,424,918 and U.S. patent app. Ser. No. 09/405,850 filed on Sep. 24, 1999, now U.S. Pat. No. 6,430,507 are both Continuation-in-Part applications of U.S. patent app. Ser. No. 09/285,570 filed on Apr. 2, 1999, now U.S. Pat. No. 6,278,948.

BACKGROUND OF THE INVENTION

1. Field of the Invention

The present invention pertains to processing potential fields data using vector and tensor data along with seismic data and more particularly to the modeling and inversion of gravity data which may also be combined with seismic data for hydrocarbon exploration and development.

2. Related Prior Art

Exploration for hydrocarbons in subsurface environments containing anomalous density variations has always presented problems for traditional seismic imaging techniques by concealing geologic structures beneath zones of anomalous density. Many methods for determining parameters related subsurface structures and the extent of the highly anomalous density zones exist.

U.S. Pat. No. 4,987,561, titled "Seismic Imaging of Steeply Dipping Geologic Interfaces, issued to David W. Bell, provides an excellent method for determining the side boundary of a highly anomalous density zone. This patent locates and identifies steeply dipping subsurfaces from seismic reflection data by first identifying select data which have characteristics indicating that seismic pulses have been reflected from both a substantially horizontal and a steeply dipping interface. These data are analyzed and processed to locate the steeply dipping interface. The processed data are displayed to illustrate the location and dip of the interface. This patent, while helping locate the boundaries, provides nothing to identify the subsurface formations on both sides of the boundary.

There have also been methods for identifying subsurface formations beneath anomalous zones using only seismic data to create a model and processing the data to identify formations in light of the model. By further processing reflection seismic data, the original model is modified or adjusted to more closely approximate reality.

An example of further processing seismic data to improve a model is U.S. Pat. No. 4,964,103, titled "Three Dimensional Before Stack Depth Migration of Two Dimensional or Three Dimensional Data," issued to James H. Johnson. This patent provides a method of creating a three-dimensional model from two dimensional seismic data. This is done by providing a method of ray tracing to determine where to move trace segments prior to stacking. The trace segments are scaled to depth, binned, stacked and compared to the seismic model. The model can then be changed to match the depth trace segments that will be stacked better, moved closer to their correct three-dimensional position and will compare better to the model. This patent uses a computationally extensive seismic process to modify a seismic model that may be inaccurate.

One source of geologic exploration data that has not been used extensively in the past is potential fields data, such as gravity and magnetic data, both vector and tensor data and using potential fields data in combination with seismic data to provide a more accurate depth model or to derive a velocity model.

Gravity gradiometry has been in existence for many years although the more sophisticated versions have been held as military secrets. The measurement of gravity became more usable in the late eighteen hundreds as measuring instruments with greater sensitivity were developed. Prior to this time, while gravity could be measured, the gravity gradient due to nearby objects could not be reliably measured.

It has been known since the time of Sir Isaac Newton that bodies having mass exert a force on each other. The measurement of this force can identify large objects having a change in density even though the object is buried beneath the earth's surface or in other ways out of sight.

Exploration for hydrocarbons in subsurface environments containing anomalous density variations such as salt formations, shale diapers and high pressure zones create havoc on seismic imaging techniques by concealing geologic structures beneath zones that are difficult to image. Often the imaging problem is due to velocity anomalies directly related to the anomalous densities of these structures. By utilizing gravity, magnetic and tensor gravity field measurements along with a robust inversion process, these anomalous density zones can be modeled. The spatial resolution obtained from this process is normally lower than that obtained from reflection seismic data. However, models obtained from gravity and magnetic data can provide a more accurate models for the seismic processing. Using the potential fields data models as an aid in seismic depth imaging processing greatly enhances the probability of mapping these concealed geologic structures beneath the zones of anomalous density.

Zones of anomalous density may also be associated with zones of anomalous fluid pressure. Typically, while drilling an oil or gas well, the density of the drilling mud must be controlled so that its hydrostatic pressure is not less than the pore fluid pressure in any formation along the uncased borehole. Otherwise, formation fluid may flow into the wellbore, and cause a "kick." Kicks can lead to blowouts if the flow is not stopped before the formation fluid reaches the top of the well. If the fluid contains hydrocarbons, there is a serious risk of an explosion triggered by a spark. For this reason, wellbores are drilled with a slight excess of the borehole fluid pressure over the formation fluid pressure.

A large excess of the borehole fluid pressure over the formation fluid pressure, on the other hand, is also undesirable. Fractures in the borehole wall may result in loss of circulation of the drilling fluid, resulting in stuck drill strings, time delays and greater costs. Serious formation damage may also occur that can decrease the amount of recoverable minerals.

Pressure prediction is done by estimating certain key parameters that include the overburden stress or confining stress, which is defined as the total lithostatic load on a rock volume at a given depth, and the effective stress, which is defined as the net load on the grain framework of the rock at a given depth. These two relations are then used in the Terzaghi effective stress law to estimate the fluid or pore pressure. Terzaghi's law states that:

$Pc=Pe+Pp$ where:

(Pc)=the confining stress
(Pe)=the stresses born by the grains, and
(Pp)=the stress born by the fluid.

Some workers treat a special case of Terzaghi's law where the confining stress is assumed to be the mean stress as opposed to the vertical confining stress. It should be acknowledged that this difference exists, but that it does not effect the embodiments of the present invention as they will pertain to estimating the total overburden load, which can then be converted to either vertical confining stress or mean stress based on the stress state assumptions that are made. A prior art method for estimating confining stress is to use a density log from a nearby calibration well and integrate the density data to obtain the overburden load. This calibration is applied from the mudline down to depths usually beyond the depth of sampling to predict the overburden away from the calibration well.

It has long been recognized that velocities of seismic waves through sedimentary formations are a function of "effective stress," defined as the difference between the stress caused by the overburden and the pore fluid pressure. A number of methods have been used to measure the seismic velocities through underground formations and make an estimate of the formation fluid pressure from the measured velocities. Plumley (1980) and U.S. Pat. No. 5,200,929 issued to Bowers, (the '929 patent) describe a method for estimating the pore fluid pressure at a specified location. The method also accounts for possible hysteresis effects due to unloading of the rock formation. The method utilized a pair of sonic velocity-effective stress relations. One relationship is for formations in which the current effective stress is the highest ever experienced. A second relationship is used when the effective stress has been reduced from the maximum effective stress experienced by the rock and hysteresis must be accounted for.

The '929 patent uses density data from nearby wells or from a geologically similar well to obtain the overburden stress. In most circumstances, the overburden stress may be adequately described by general compaction models in which the density increases with depth, giving rise to a corresponding relation for the relation between depth and overburden. In the absence of well control, determination of the overburden stress even within a sedimentary column is problematic. Furthermore, there are circumstances in which the model of a density that increases uniformly with depth is not valid. In such cases, the assumption of increasing density with depth is violated and a different approach to estimation of the overburden stress is needed.

There are several types of situations that may arise wherein a model of density increasing with depth and compaction is not valid. In the first case, there is a region of abnormally high density in the subsurface, usually of magmatic origin. The region could consist of an extrusive or intrusive volcanic material having relative density of 2.8 or higher. When such a formation is present within a sedimentary section where the relative density is typically between 2.4 and 2.65, the result is an increase in the overburden stress underneath the formation over what would be determined by prior art calculations. On the other hand, a region of abnormally low density may occur from salt bodies (2.10) or shale diapirs. In such a case, the overburden stress is abnormally low compared to what would be determined by prior art methods. In either case, even if the effective stress could be determined from seismic velocity measurements, a formation fluid pressure determination based on a prior art density model would be invalid.

FIG. 1 is a seismic section illustrating an area of interest having highly anomalous density zones such as salt domes. A rounded interface can be seen as masking the formations below. For this data set, the lower boundary cannot be determined by normal seismic data processing methods.

There is a need for a method to image subterranean formations which are responsive to potential fields and non-potential fields data. There is a need for a method to combine these data types to extract more useful information than either data type has provided before. There is a need for a method that can more accurately determine the density of the subsurface in three dimensions away from and deeper than the limits of density from well control. The present invention satisfies this need.

SUMMARY OF THE INVENTION

The present invention is a method for determining a parameter of interest of a region of interest of the earth. At least one component of potential fields data is measured at a plurality of locations over a region of interest including a subterranean formation of interest. The potential field data are selected from magnetic data and gravity data. An initial geophysical model is determined for the region including the subterranean formation of interest. For the model, geophysical tensor data is updated using a forward model at a plurality of locations using a High Order Compact Finite Difference method and may include conjugate gradient methods. The method may be used to determine potential field measurements within a source region that is difficult to formulate using standard intregal equation approach where the Green's function is evaluated. Green's functions evaluations are expensive and require significant memory to store, where as in this formulation only requires storing a sparse stencil. A difference between the estimated model value and the measured value of the potential field measurements are determined at the plurality of locations. Based on this difference the geophysical model is updated. The model is iteratively updated and compared to the measured data until the differences reach an acceptable level and the parameter of interest has been determined.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The present invention and its advantages will be better understood by referring to the following detailed description and the attached drawings in which.

DESCRIPTION OF THE PREFERRED EMBODIMENT

Figure 1:
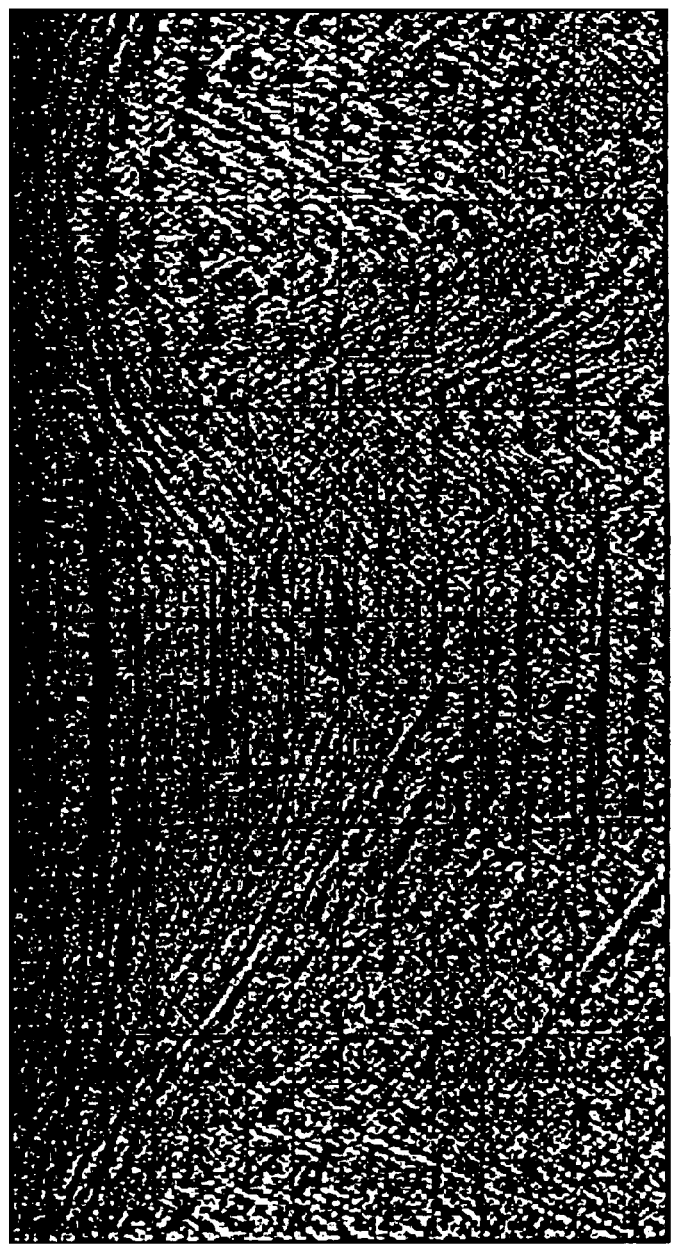
FIG. 1 is a seismic section of an area having anomalous density zones such as a salt dome.

The present invention provides a 3D forward modeling method to compute gravity and tensor gravity data using Poisson's equation for airborne, surface and borehole applications in exploration problems. The forward modeling is based on a differential equation approach for solving the Poisson's (or Laplace's) equation using high order compact finite difference methods or finite element methods.

The formulation of the present invention makes it possible to build inversion processes to predict or determine subsurface parameters, structures and areas of interest so as to minimize the difference between any or all of the model fields and their measured counterparts. Since this inversion process is so robust and applicable to so many varied field measurements, it is useful for exploration at both regional and prospect scales.

U.S. Pat. Nos. 6,278,948, 6,424,918, 6,430,507, and 6,502,037 and U.S. patent application Ser. No. 10/236,204 having the same assignee and the contents of which are fully incorporated here by reference, disclose methods and apparatus in which gravity and magnetics inversion techniques developed for use with gravity, Full Tensor Gradiometry (FTG) gravity and magnetics can be used as a driver for building earth models that may be used with seismic data processing. Some of the disclosures of the '948, '918, '507 and '037 patents and the '204 application are included here for convenience.

These previous inventions utilize very robust formulations for calculating vector and tensor gravity and magnetic fields due to a parameterized model such as salt formations embedded in a known or assumed distribution of sediments. The embedded model is composed of an upper boundary, usually mapped from seismic data, and a parameterized lower boundary to be determined by an inversion process. The parameterized lower boundary first uses gravity and/or magnetic data to predict parameters. Then, seismic data can be combined to provide a depth image using the predicted parameters as the driver. Further, a velocity model can be derived using the predicted parameters. In the alternative, the seismic data may be used as an additional constraint in running the inversion process again. This process of inversion followed by seismic imaging followed by another inversion and seismic imaging step may be repeated until the results of the potential fields inversion and the seismic imaging processes converge to a single answer or a point of diminishing returns is reached. Otherwise, if the process results begin to diverge indicating that there is not a unique solution, the process is discontinued.

The inversion process of the present invention demonstrates its strength in several areas. In the area of background sediment and subsurface formation properties, the density can have any horizontal variability including discontinuities. The depth variation of these properties is assumed to be a polynomial up to order six for density. Thus, for practical purposes, there are no apparent restrictions on the variability of density especially considering the inherent resolution of gravity analyses.

Computations based on parallel computing techniques are very fast for three-dimensional models. The inversion process setup is ideal for using multiple processors. Thus, the elapsed time previously required for large three dimensional inversion processes can be greatly reduced. This is especially important for regional studies where large data sets are required.

For data preparation, the forward modeling portion of this inversion method is also used to correct the gravity and gravity tensor data for complex bathymetric effects. Bouguer corrections are made assuming a depth dependant density in order to obtain better input gravity and tensor data for the inversion process. This represents a substantial improvement over the standard use of a constant Bouguer density.

Some of the major problems confronting the application of any modeling technique applied to potential field data are the removal of the regional field and, thus, the isolation of the field believed to be associated with the scale of the model being examined. By properly filtering the data between successive iterations in the inversion process, predicted regional fields can be obtained for gravity and magnetic data sets simultaneously, thus allowing convergence to a common model structure that explains both the band-limited gravity and magnetic fields associated with the anomalous body. The resulting regional fields then can be modeled to predict deep-seated structures beneath the area of immediate interest.

Part of the inversion process that dramatically improves the convergence and efficiency of the algorithm is a predictive filtering procedure that reconstructs the regional field from the inversion itself. At each inversion step, the inversion estimates the anomalous body model that is required to fit the data and compares this model response to the observed field. The difference between the model and the observed field is treated as a "residual" or "error", the long wavelength component of this error field is calculated and attributed to the regional field that must be accounted for in the regional model. This long wavelength residual is used to reconstruct the regional model and this reconstructed regional model is compared to the long-wavelength regional component that is removed early in the preprocessing of the potential fields data to make sure that the signal used in the inversion was properly separated between signal related to the anomalous bodies and that related to the regional field.

An important aspect of this invention is that the observation positions can be distributed arbitrarily, and even be positioned inside the source area, thus removing the need to have the data in a gridded form on the same datum. This is important when simultaneously inverting different data sets and using borehole gravimeter data. Also, data sets from various contractors may have very different acquisition characteristics including geographic grids. Additionally, individual field observations may be weighted in the inversion process according to their uncertainty.

Gravity data are generally acquired for the exploration of oil and gas or other natural resources like minerals and ore bodies. The different data types that are commonly acquired depend on the exploration objectives. The different types are: surface gravity data, tensor gravity data, airborne gravity data and borehole gravity data. The goal is to obtain subsurface density information or structural information from these different data sets by forward modeling and inversion. In principle, the density anomalies in the earth produce signals recorded in these data sets. Therefore one of the objectives is to compute the earth gravity response to subsurface anomalies using forward modeling with a known or estimated density model. The current invention of solving the Poisson's equation (using a high-order compact finite difference method) allows us to generate the gravity and tensor gravity responses in the entire medium as well as in the air with a single forward modeling run. This allows us to compute surface and borehole gravity responses concurrently without any additional complication in forward modeling. Prior art practice has been to compute the gravity and tensor gravity responses using an integral formulation that is much more complex, especially in the regions containing the source. This also requires more memory and computation time. The forward modeling approach method of the present invention provides the flexibility to invert surface, airborne and borehole gravity data simultaneously to recover density distribution in the subsurface.

As is well known by practitioners in the art, the divergence theorem may be applied to the gravitational field 'g':

$$\int_V \Delta \cdot g \, dv = \int_S g_n dS.$$

With no attracting matter within the volume, $\nabla \cdot g = 0$. This can be written as $$\nabla \cdot \nabla U = \nabla^2 U = 0.$$

Prior art methods for modeling of tensor gravity data are based on solving the integral formulation for the different components of tensor gravity and a component for the vertical attraction. These methods can be used easily when the point of observation is outside the source to calculate gravity components on the surface. The methods involve the integration of each differential volume into which a model is discretized.

If there is a particle of mass 'm' within the volume 'v' then the surface integral is different than zero and equal to:

$$\int_S g_n dS = -4\pi\gamma\rho$$

This gives Poisson's equation $$\nabla^2 U = -4\pi\gamma\rho,$$

where $\rho$ is the source density and $\gamma$ is a constant (the gravitational constant in the case of mass and gravitational potential). Poisson's equation may be written alternatively as, $$\nabla^2 U(x, y, z) = -4\pi\gamma\rho(x, y, z).$$

The forward modeling of Poisson's equation using the method of the present invention provides the flexibility to generate data in the entire medium including the source regions and thus allows inversion of surface and borehole gravity to recover density distribution in the subsurface. This is accomplished using the High-order compact finite difference (HOCFD) method. From a modeling standpoint this allows for generation of gravity and tensor gravity fields for the surface as well as for borehole data.

Rewriting Poisson's equation as $$\nabla^2 \phi = f,$$

the equation may be discretized in this form as $$\delta_x^2 \phi_{ijk} + \delta_y^2 \phi_{ijk} + \delta_z^2 \phi_{ijk} - \tau_{ijk} = f_{ijk}.$$

The term $\tau_{ijk}$ is the error from the approximation. Central differences are used to
calculate the operator in the discrete form using $$\delta_x^2 \phi_{ijk} = \frac{\phi_{i+1,j,k} - 2\phi_{i,j,k} + \phi_{i-1,j,k}}{2\Delta x}.$$

Performing an expansion then:

$$\phi(x+\delta x) = \phi(x) + \frac{\partial \phi}{\partial x}\delta x + \frac{\partial^2 \phi}{2!\partial x^2}\delta x^2 + \frac{\partial^3 \phi}{3!\partial x^3}\delta x^3 +$$
$$\frac{\partial^4 \phi}{4!\partial x^4}\delta x^4 + \frac{\partial^5 \phi}{5!\partial x^5}\delta x^5 + \frac{\partial^6 \phi}{6!\partial x^6}\delta x^6$$

and $$\phi(x-\delta x) = \phi(x) - \frac{\partial \phi}{\partial x}\delta x + \frac{\partial^2 \phi}{2!\partial x^2}\delta x^2 - \frac{\partial^3 \phi}{3!\partial x^3}\delta x^3 +$$
$$\frac{\partial^4 \phi}{4!\partial x^4}\delta x^4 - \frac{\partial^5 \phi}{5!\partial x^5}\delta x^5 + \frac{\partial^6 \phi}{6!\partial x^6}\delta x^6$$

Adding these equations and dividing by the cell thickness leaves $$\phi_{xx} = \frac{\partial^2 \phi}{2!\partial x^2} + \frac{\partial^4 \phi}{\partial x^4}\frac{\delta x^2}{12} + \frac{\partial^6 \phi}{\partial x^6}\frac{\delta x^4}{360} + O(|\delta x|^6)$$

If all the terms in the Taylor series expansion are used, a high order approximation results. Common finite-difference methods eliminate the higher order terms leaving a second order approximation as $$\phi_{xx} = \frac{\partial^2 \phi}{2!\partial x^2}.$$

The error approximation term then is given by $$\tau_{ijk} = \frac{h^2}{12} + \left[\frac{\partial^4 \phi}{\partial x^4} + \frac{\partial^4 \phi}{\partial y^4} + \frac{\partial^4 \phi}{\partial z^4}\right] + O(|\delta x|^6)$$

where the value of the fourth order derivatives is given by $$\frac{\partial^2}{\partial x^2}\left(\frac{\partial^2 \phi}{\partial x^2}\right) = \frac{\partial^2}{\partial x^2}\left(f - \frac{\partial^2 \phi}{\partial y^2} - \frac{\partial^2 \phi}{\partial z^2}\right).$$

Substituting the error approximation into the original discretization results in the "High Order Compact Finite Difference" equation:

$$\left[\delta x^2 + \delta y^2 + \delta z^2 + \frac{h^2}{6}(\delta x^2 \delta y^2 + \delta y^2 \delta z^2 + \delta x^2 \delta z^2)\right]\phi_{ijk} =$$

$$f_{ijk} + \frac{h^2}{12}[\delta x^2 + \delta y^2 + \delta z^2]f_{ijk} + O(h^4)$$

Figure 2A:
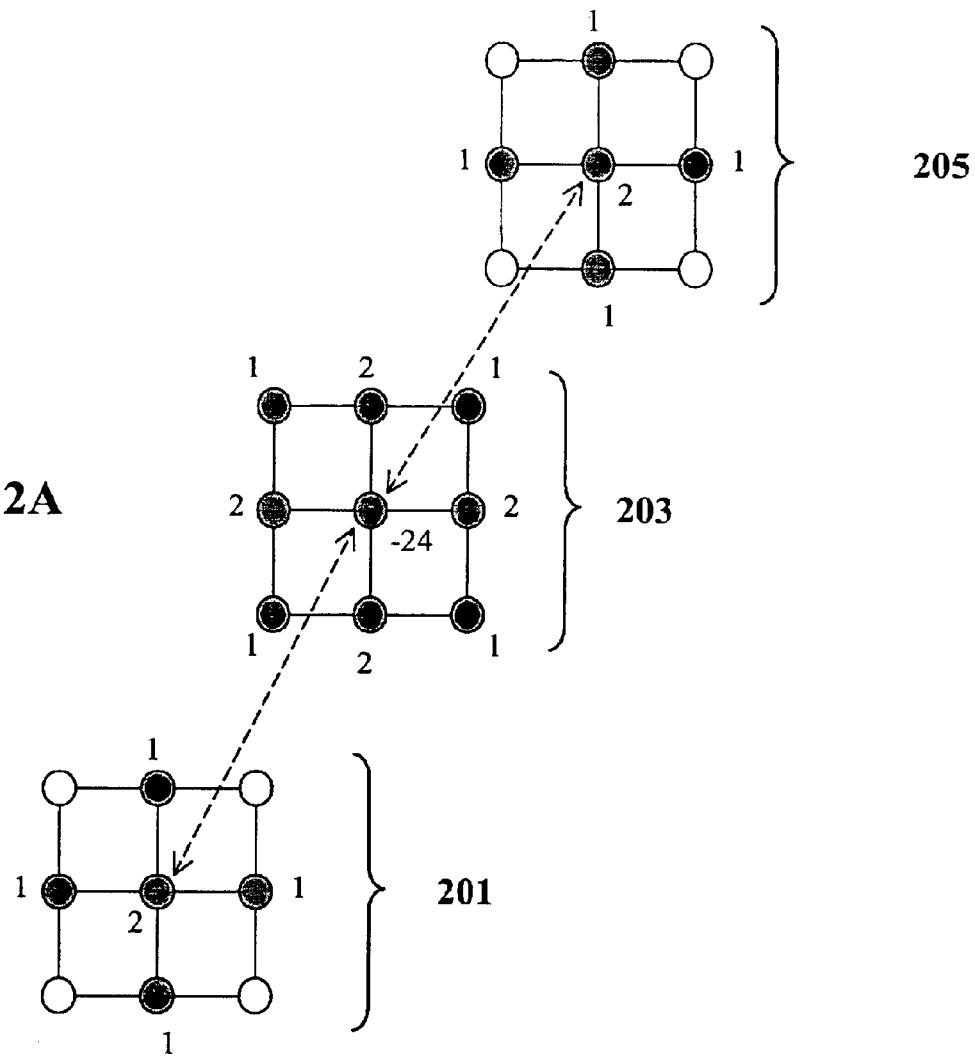
FIG. 2A illustrates a 19 point finite difference stencil with matrix coefficients.
Figure 2B:
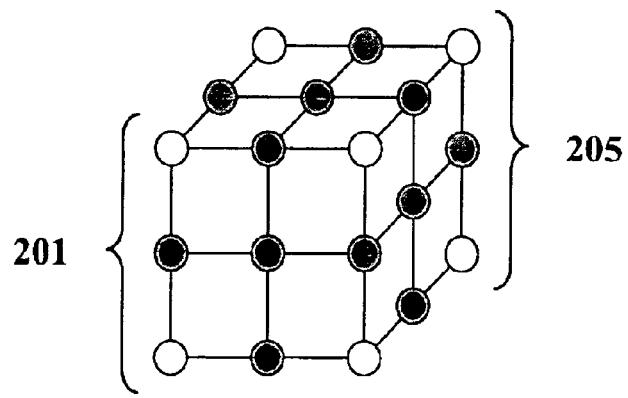
FIG. 2B illustrates the finite difference stencil of FIG. 2A displayed as a cube.

This equation corresponds to a 19-point stencil as illustrated in FIG. 2A and FIG. 2B. In this equation, the right hand side is made up of the usual approximation $\delta x^2 + \delta y^2 + \delta z^2$ and the higher order contribution $$\frac{h^2}{6}(\delta x^2 \delta y^2 + \delta y^2 \delta z^2 + \delta x^2 \delta z^2).$$

The left hand side is made up of the source function $f_{ijk}$ and the second derivative of the source function, $$\frac{h^2}{12}\left[\delta x^2 + \delta y^2 + \delta z^2\right]f_{ijk}.$$

The 19-point High Order Finite Difference Stencil "L" is illustrated in FIG. 2A and FIG. 2B encompassing all the nodes of the mesh located on the three grid planes which intersect the center node of the cube, but not the corner points of the surrounding cube. An expanded view of the stencil with its matrix coefficients is illustrated in FIG. 2A. The 5 solid vertices of the 9 point planes 201 and 205 of the stencil are combined with the 9 vertices on plane 203 to make up a 19 point finite difference stencil illustrated in FIG. 2B. This is a 19 point operator for equi-spaced grid points. Stencils for other grids are known in the art and may be incorporated into the method of the present invention. For example, a 27 point operator formulation (for an O($h^6$) method) is described in 'A High-Order Compact Formulation for the 3D Poisson Equation' by W. F. Spotz and G. F. Carey, Numerical Methods for Partial Differential Equations, 12, 1996, pp. 235–243.

Stencils for arbitrarily spaced grids are known in the art and may be incorporated into the method of the present invention. These arbitrarily spaced grids will allow for varying boundary conditions.

Poisson's equation $\nabla^2 U = -4\pi\gamma\rho$ may be expressed in matrix form as $$LU_{ijk} = -4\pi\gamma\rho_{ijk}$$

where L is the Finite Difference diagonal dominant matrix. The finite difference matrix can be stored in a compact sparse row format that requires only three vectors, therefore reducing memory significantly over other methods. The Finite Difference system of equations can be inverted using Conjugate Gradient methods and their variants that require one matrix vector multiplication. A conjugate gradient method implementation works quickly for compact sparse row matrices compared to other methods.

The conjugate gradient method is a method for finding the nearest local minimum (the smallest value of a set, function, etc., within some local neighborhood) of a function of n variables which presupposes that the gradient of the function can be computed. A gradient in three dimension is, for example, the vector sum of the partial derivatives with respect to the three-coordinate variables x, y, and z of a scalar quantity whose value varies from point to point. The conjugate gradient method uses conjugate directions instead of the local gradient for going downhill. If the vicinity of the minimum has the shape of a long, narrow valley, the minimum is reached in far fewer steps than would be the case using other methods, for example the method of steepest descent.

As an example of an embodiment of the present invention, a discretized operator L in the expression $L\vec{U} = \vec{f}$ may be computed and examined for comparison using an analytic function for which the exact solution is known. Here U = sin $\pi$x sin $\pi$y sin $\pi$z, $f = -3\pi^2$ sin $\pi$x sin $\pi$sin $\pi$z, for $\Omega \in [0,1]^3$.

Figure 3:
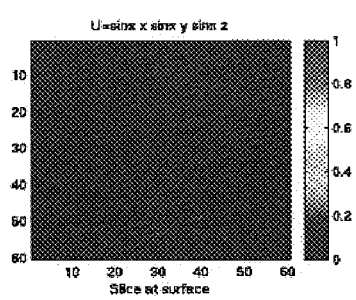
FIG. 3 illustrates a comparison of an analytic solution with numerically calculated model data.
Figure 3:
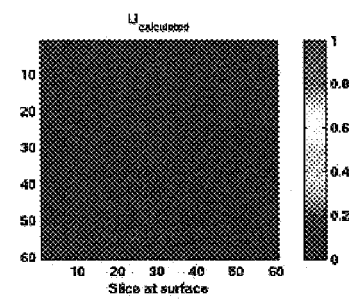
Figure 3:
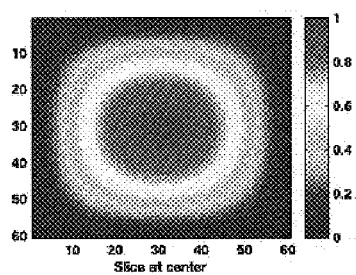
Figure 3:
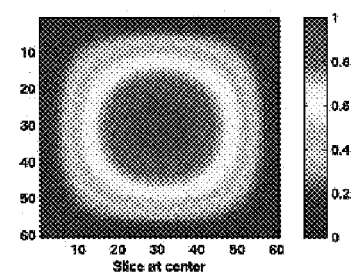

FIG. 3 illustrates a comparison of the analytic solution for the observed data from the potential U on the left-hand side 301, 303 with the calculated data on the right 305, 307. The lower panels 303 and 307 illustrate the potential U at the center of the volume.

Figure 4A:
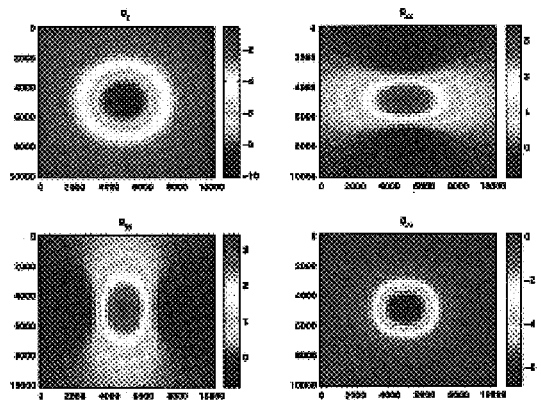
FIG. 4 illustrates a comparison of an integral formulation to a differential formulation.
Figure 4B:
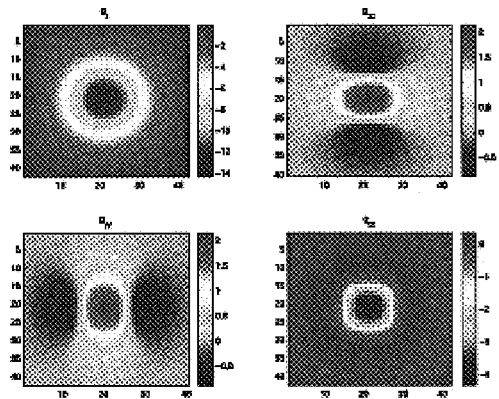
Figure 4E:
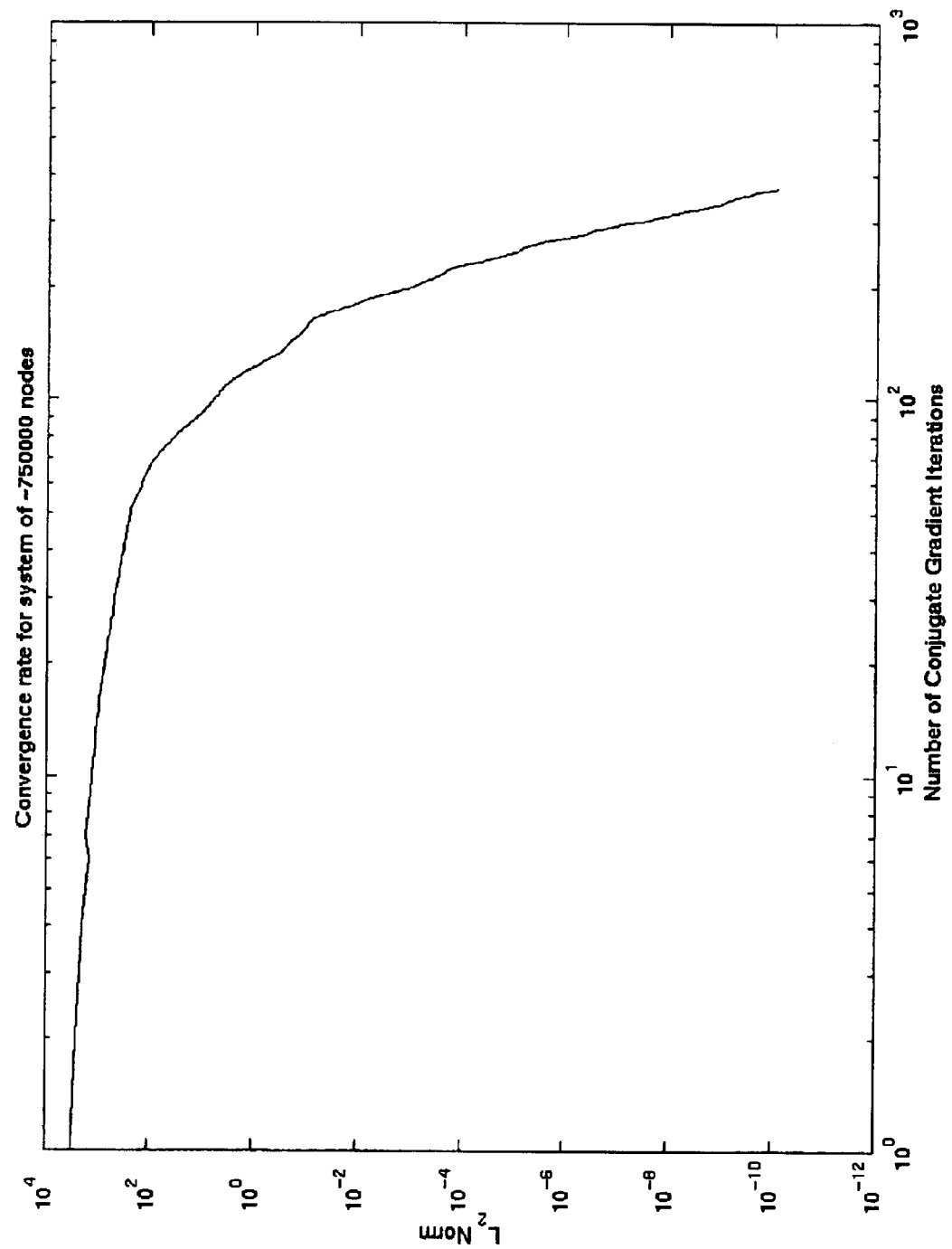

FIG. 4A illustrates an example of forward modeling the gravity fields using $$\nabla^2(\Delta U) = -4\pi\gamma\Delta\rho$$

where the density change $\Delta\rho = -0.4$gr/cm$^3$. The integral formulation results of the model are illustrated in FIG. 4A with the vertical gravity $g_z$, and gravity tensors $g_{xx}$, $g_{yy}$, $g_{zz}$. The integral formulation results may be favorably compared with the results of the differential formulation as illustrated in FIG. 4B with the vertical gravity $g_z$, and gravity tensors $g_{xx}$, $g_{yy}$, $g_{zz}$. FIG. 4C illustrates the gravity tensors $g_{xz}$, $g_{yz}$, $g_{xy}$ for the integral formulation and FIG. 4D illustrates the gravity tensors $g_{xz}$, $g_{yz}$, $g_{xy}$ for the differential formulation of the present invention. It is important also to note the boundary condition that the potential (U) goes to zero as distance goes to infinity. FIG. 4E illustrates the convergence of the system of equation using conjugate gradient method. It took 10 min to solve on a SUN blade machine with ¾ million nodes.

Figure 5A:
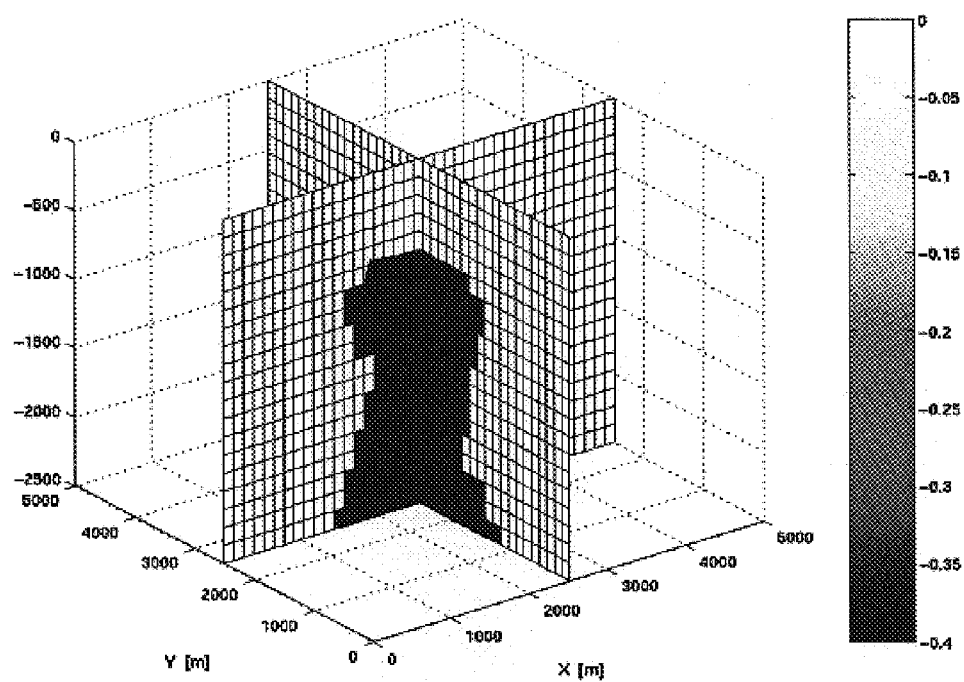
FIG. 5A illustrates a realistic model with parameters which approximate a salt diapir.
Figure 5B:
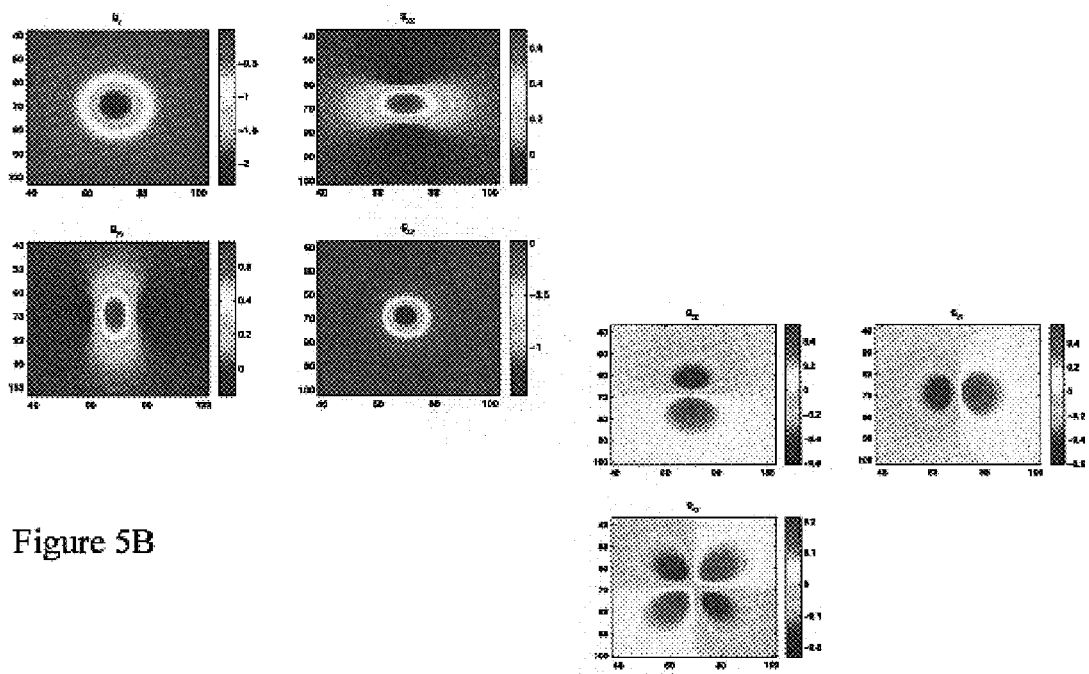
FIG. 5B illustrates the finite difference forward modeling results of a realistic model with parameters which approximate a salt diapir of FIG. 5A.

FIG. 5A illustrates a realistic model with parameters which approximate a salt diapir with a density contrast of 0.4 grams per cubic centimeter, as shown by the change in density scale on the right. FIG. 5B illustrates the results of the method of the differential formulation of the present invention used to reconstruct the diapir with the vertical gravity $g_z$, and gravity tensors $g_{xx}$, $g_{yy}$, $g_{zz}$ and $g_{xz}$, $g_{yz}$, $g_{xy}$.

As the method of the present invention can be used inside the volume containing the sources and inside the sources, this method has application to borehole gravity data. Prior art borehole gravity technology calculates an apparent density from the observed vertical gravity as follows:

$$G_{zz} = \frac{g_z(z_0) - g_z(z_0 + \Delta z)}{\Delta z}.$$

Figure 6:
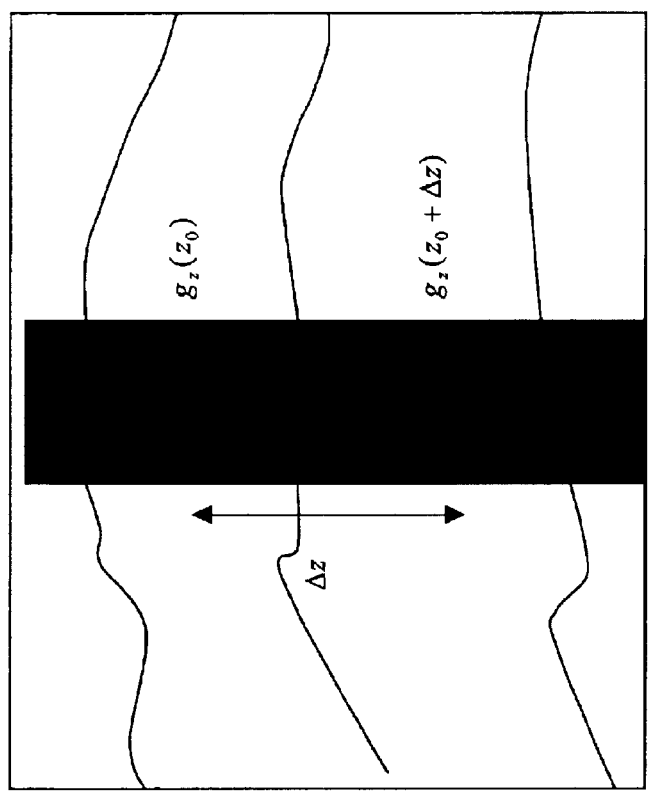
FIG. 6 illustrates borehole gravity apparent density depth dependence.

FIG. 6 illustrates this $\Delta z$ dependence schematically. Apparent density is calculated as:

$$\rho_a^{pred} = \frac{-1}{r\pi\gamma}G_{zz}.$$

Figure 7:
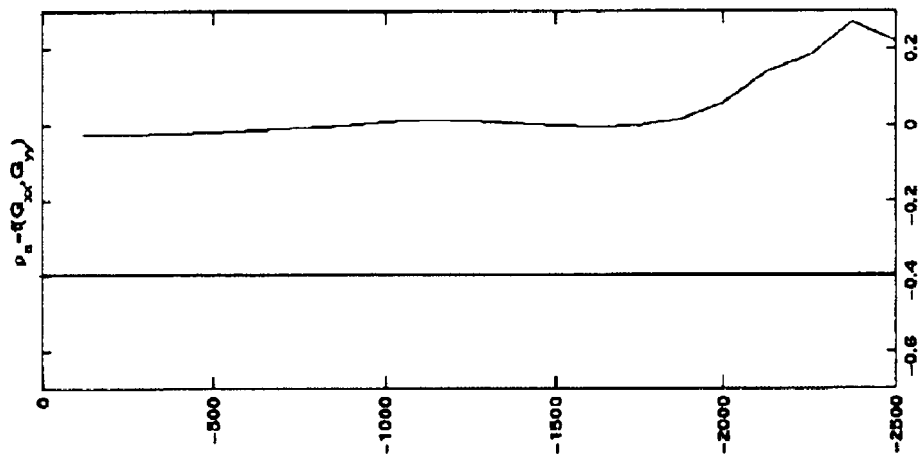
FIG. 7 illustrates that the calculation of apparent density from borehole gravity using only the vertical component of the field results in an anomalously high density value.
Figure 7:
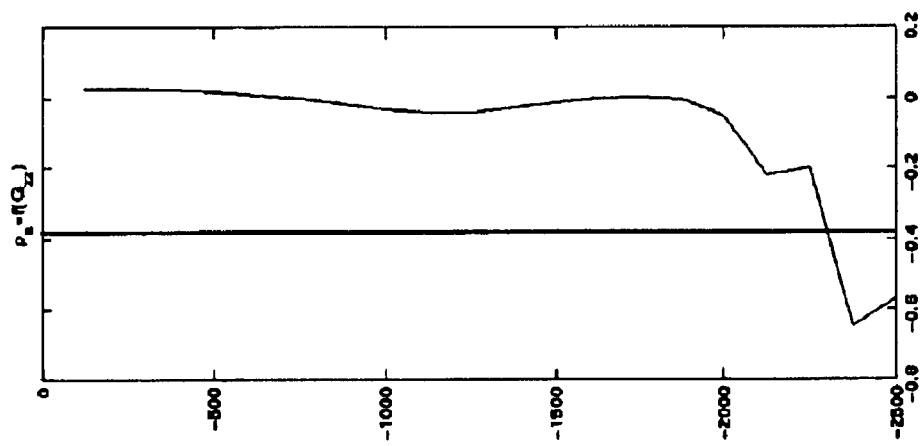
Figure 7:
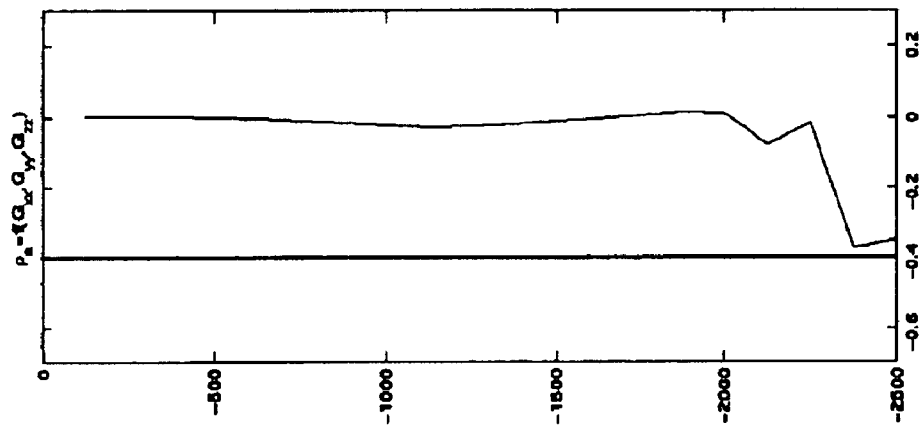
Figure 8:
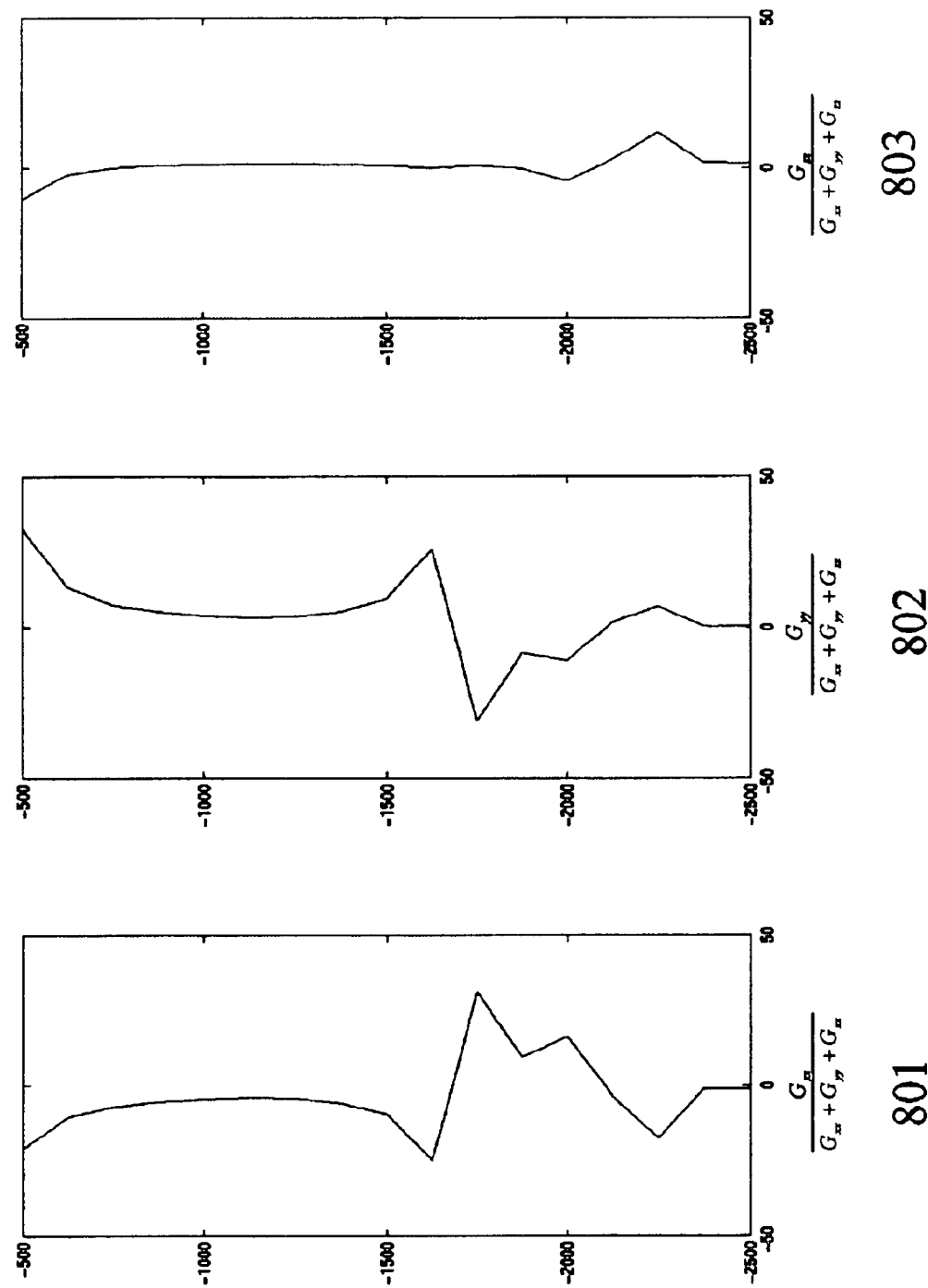
FIG. 8 illustrates the contribution of each tensor component in the apparent density in borehole measurements.

As illustrated in FIG. 7, calculation of apparent density from borehole gravity using only the $G_{zz}$ component 702 of the field results in an anomalously high density value AV. Combining the effect due to $G_{xx}$ and $G_{yy}$ as illustrated in panel 703 results in a more accurate value for the density anomaly as shown in panel 701. The contribution of each tensor component to the apparent density is illustrated in FIG. 8. Panel 801 illustrates component $G_{xx}$ normalized by $G_{xx}+G_{yy}+G_{zz}$. Panel 803 illustrates component $G_{yy}$ normalized by $G_{xx}+G_{yy}+G_{zz}$. Panel 805 illustrates component $G_{zz}$ normalized by $G_{xx}+G_{yy}+G_{zz}$.

When the tensor fields are modeled with the differential form of the present invention we get, as a bonus, the capability of doing upward continuations as part of the calculations. The upward continued field is a result from computing the forward model.

In a preferred embodiment of the present invention the forward modeling method for tensor gravity data is implemented by solving Poisson's equation using a $4^{th}$ order accuracy finite difference scheme. This enables accurate computation of the tensor gravity components. This implementation has the power of modeling surface tensor gravity data as well as borehole gravity data. Using horizontal tensor components of borehole gravity data contributes to a better prediction of the apparent density. Accurate modeling of borehole gravity data allows for more efficient monitoring of oilfields over time. The method adapts easily to compute upward and downward continued potential fields.

Other variations are within the scope of the present disclosure. For example, the method is readily adaptable to be used within an inversion procedure that uses integral equations to calculate a forward model.

Gravity, tensor gravity and borehole data are acquired in the exploration for oil, gas and minerals. These data provide a means to image the subsurface, based on density anomalies in the earth. The high order compact finite difference methodology using this work allows us to obtain accurate gravity (third order accuracy i.e. $O(h^3)$) and tensor gravity (second order accuracy, i.e. $O(h^2)$) in the entire medium. This methodology significantly improves the accuracy over the conventional nine point finite difference approaches and therefore is highly advantageous for the modeling these field. The finite difference stencil used in a preferred embodiment is a 19 point stencil. The resulting system of equations is stored in a compressed row sparse format for use with the conjugate gradient inversion techniques as described earlier.

The gravity ($G_x$, $G_y$, $G_z$) and gravity tensor components ($G_{xx}$, $G_{yy}$, $G_{zz}$, $G_{xy}$, $G_{xz}$, $G_{yz}$) are computed by obtaining the gravitational potential in the entire discretized medium using the above method. Subsequently the gravity and the tensor components are evaluated using forward and central difference formulas. The values of the components that are staggered with respect to the original mesh (coordinate layout) are interpolated to the initial nodal coordinates using a 3D interpolation method. The method of the present invention also provides for a formulation that can handle unequal cell sizes to compute the potential. Adapting the present High Order Compact formulation for use with unequal cell sizes has the advantage of imposing the Dirichlet boundary condition (i.e. where the potential goes to infinity) with fewer cells.

Figure 9:
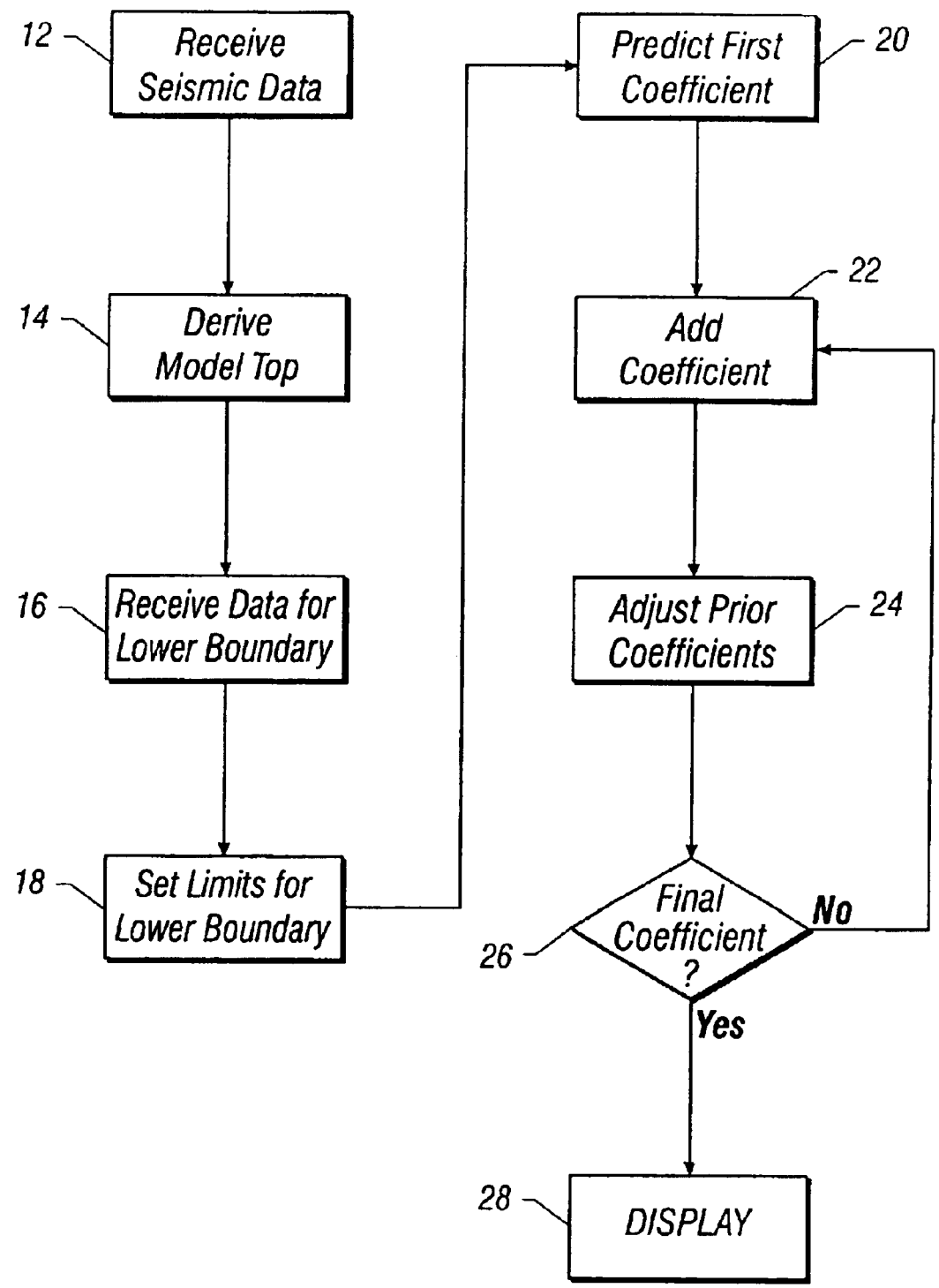
FIG. 9 is a flow chart illustrating geophysical model development.

Referring now to FIG. 9, this flow chart illustrates a method for providing an initial model upon which derivation of subsurface formations (the geophysical model) can be based. At block 12 reflection seismic data is received. In general, reflection seismic data is more reliable than other forms of geologic exploration data in most situations because of the extensive work and research that has been devoted to its use and application.

At block 14, the reflection seismic data is used to derive the top portion of a geologic model. As stated previously, reflection seismic data is very reliable, at least in this situation, for determining a model containing the top of an anomalous density zones. Geologic boundaries beneath the top of an anomalous zone or boundary are not as easily modeled. While reflection seismic data is generally more reliable than other forms of geological surveying, anomalous density zones, such as a salt dome, obstruct, divert or highly distort seismic reflection information below the boundary or zone. In this type of area, reflection seismic surveying becomes unreliable, as shown in the example of FIG. 1. In some cases, the reflection seismic data becomes so unreliable that no useful information below the salt dome can be obtained from reflection seismic exploration.

At block 16 data pertaining to the determination of the lower boundary is received. This data may take the form any potential fields data, both vector and tensor. In the formulation used herein, the type of data is of no concern since any combination of the above mentioned data can be processed simultaneously. Although these types of data generally provide less resolution than reflection seismic data, in the case of an anomalous density zone, potential field data may provide the most reliable available data.

The data received are used to formulate the limits of the lower boundary for the geologic model block 18. The actual lower boundary derivation is done by predicting parameters representing the lower boundary, and this predicting maybe done by a-priori knowledge or through an inversion process.

Although various inversion techniques can be utilized to determine the parameters (coefficients) representing the lower boundary, one preferred embodiment of the present invention involves the successive inversion of a single coefficient at a time until all coefficients are determined. The total number of coefficients is set apriori at block 18 based upon the minimum wavelength (maximum frequency) desired in the lower boundary. Typical lower boundaries may contain as many as nine hundred coefficients for three-dimensional models, thirty in each horizontal direction. For example, if $x_1$ and $x_2$ are the spatial limits of integration in the x direction, and $y_1$ and $y_2$ are the spatial limits of integration in the y direction, and half cosine series are used, the number of terms required in the x and y directions respectively for a minimum wavelength of $\lambda_{min}$ are:

$$n_x = \frac{2(x_2 - x_1)}{\lambda_{min}} + 1 \quad (1)$$

and $$n_y = \frac{2(y_2 - y_1)}{\lambda_{min}} + 1 \quad (2)$$

Thus the total number of coefficients representing the lower boundary is $n_x$ multiplied $n_y$.

At block 20, the first coefficient representing a uniform lower boundary (longest wavelength component) is predicted. This coefficient is based on the received data and represents the best fit possible with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision block 26 a determination is made as to whether all coefficients have been predicted. If they have not, the program returns to block 22 where another coefficient is added.

If all coefficients have been predicted, the program proceeds to block 28 where the lower boundary is displayed and subsequently sent on to the forward modeling of the present invention. The display may take any form currently in use in the art, such as a monitor display, a hard copy printout or be kept electronically on tape or disc.

Initial geophysical model development and the updating of geophysical models based the differences between measured and estimated gravity and gravity tensor data are extensively covered in the disclosures of the '948, '918, '507 and '037 patents and the '204 application which have been fully incorporated herein by reference. Further updating geophysical models based on integration of potential fields and seismic data is covered in these disclosures as well.

A number of embodiments of the '204 application are described therein which are applicable for combination with method of the present invention. In one embodiment, the predicted parameters are combined with seismic data to obtain a depth image and a velocity model for delineating formations or parameters of interest. In a second embodiment, imaging of the seismic data is performed using a lower boundary determined from the initial inversion. This seismic result is mapped to determine the position of the base of the anomalous body and is compared to the model parameters to obtain a difference between the two. The parameters are adjusted to provide a best fit. A new model is formed based on the new predicted parameters, and the potential fields modeling (using HOCFD in the present case) and seismic imaging modeling results are iterated until the solution converges.

Where an anomalous body or subterranean formation of interest is a volcanic intrusive or extrusive body that has higher density than the surrounding sedimentary formations, the overburden stress will be higher than would be expected in a comparable depth of sedimentary rocks. The present invention is able to account for the effects of zones of anomalous density by determining the actual density, whereas prior art methods assume that density increases uniformly with depth or varies with depth based on limited well information.

One embodiment of the present invention includes a modification of the very fast inversion process which produces models using vector and tensor potential methods (applicable for both gravity and magnetic data). This modification involves solving the inverse problem by using a constrained optimization approach, for example, a constrained nonlinear inversion method. The formulation allows imposing constraints on the solution as well as incorporating any geologic apriori information in the inversion algorithm. The computational speed is achieved using a conjugate gradient solver and using approximate sensitivity when required. The algorithm has the flexibility to allow an interpreter to carry out hypothesis testing, based on his geologic intuition or any other information about the model derived from any sources, for example, geophysical or geological data.

The method of this embodiment applies a constrained nonlinear inversion method using a Gauss-Newton approach. The model is parameterized using, for example, a boxcar basis function. Then the forward problem is solved using the method described above. In the inversion algorithm we invert for all model parameters simultaneously and optimally constrain parameters by imposing soft bounds on the solution. This bounded minimization problem is solved using an interior-point method. Interior-point methods are well known in linear programming. The interior-point algorithm guarantees that the solution will remain within bounds, i.e. the inverted base of salt will always be greater than (or equal to) the top of salt and less than any prescribed upper bound. This formulation has many model parameters compared to the data, which leads to an underdetermined problem. Therefore, to address the non-uniqueness issues, we minimize a model objective function subject to fitting the data. The choice of this model objective function is generally geologically driven. For example, we can impose smoothness criteria in some regions of the model and also allow sharp features to be built in other regions like faults that may be based on knowledge or geological objectives. In essence this model objective function can be used to impose a constraint on the model based on apriori knowledge. For example, a topological constraint may be placed on the base of the salt model (or any other parameter) based on apriori knowledge, and geological or geophysical information of the subsurface.

Since we are solving for all of the model parameters in this approach, the system of equations may require a large matrix system be solved. Using a least-squares conjugate gradient solver and using approximate sensitivity when necessary achieves an increase in computation speed. The approximate sensitivity requires less storage and allows the matrix to be stored in a sparse form with very minimal loss in the information content due to approximation. The noise in the data is handled using data weighting matrices. Appropriate stopping criteria for the convergence of the inversion process may be implemented and based on the assumption that the noise is random and has a Gaussian distribution. Other distributions and parameterization functions may be easily incorporated into this methodology.

The constrained nonlinear inversion method using a Gauss-Newton approach leads naturally to an addressing of resolution issues for the inverted model. In the regions that are not constrained by the data, the model parameters from inversion may not be realistic. To avoid this problem, a reference model may be built into the inversion algorithm. Thus if the regions are insensitive to the data, the recovered model from inversion will reflect the reference model. This can be used to identify regions in the inverted model that are demanded by the data and thus provide a better interpretability of the results.

Figure 10:
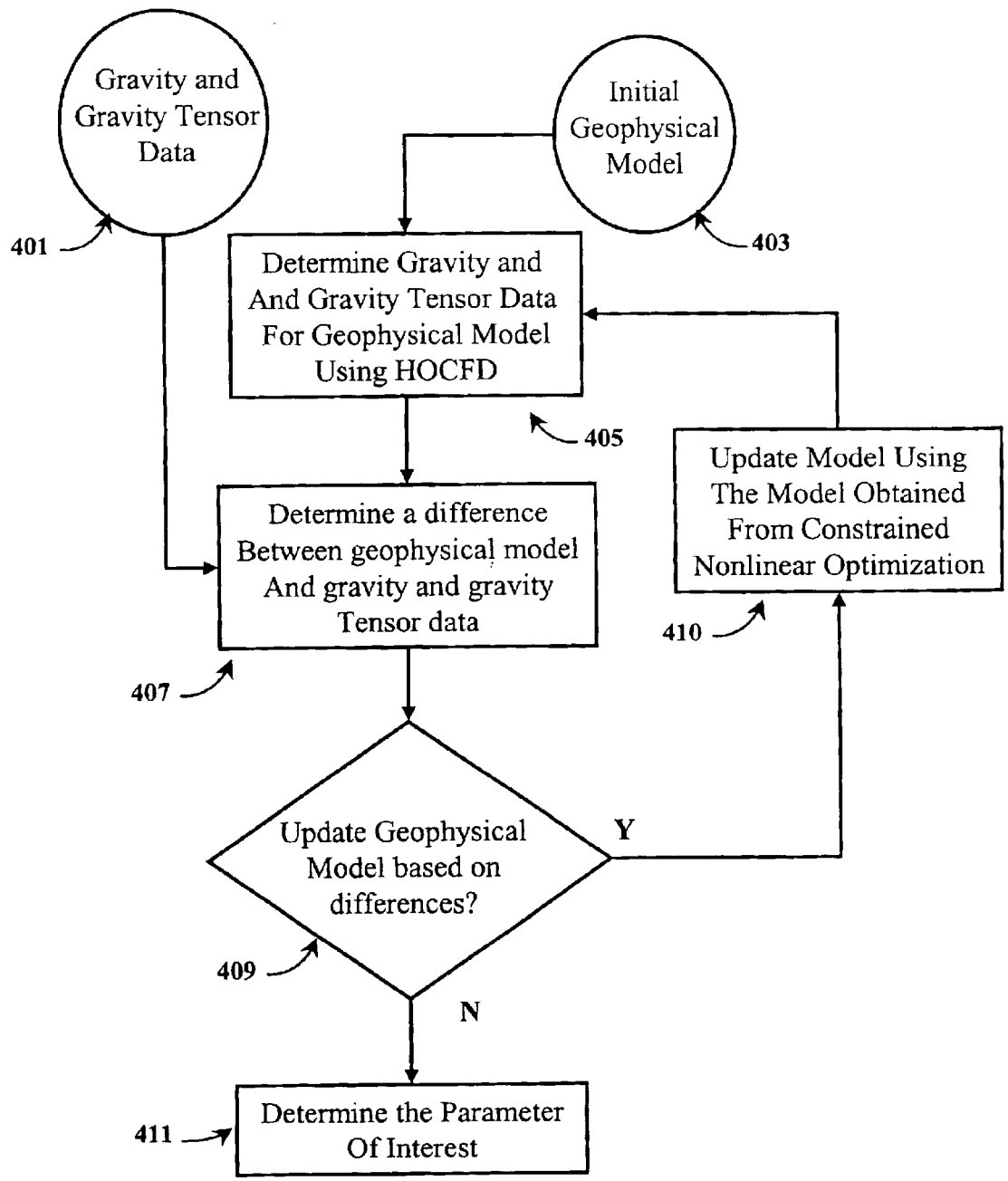
FIG. 10 is flow chart of an embodiment of the invention using constrained optimization.

The method of this embodiment is further explained with reference to the flow chart of FIG. 10. Gravity data 401, which may include gravity tensor data, are acquired for input to the method of the invention. An initial geophysical model 403 is determined or derived from apriori knowledge and/or other available data. A model potential field 405 is determined from the initial geophysical model 403. The initial geophysical model can be made using the forward modeling of the High Order Compact Finite Difference (HOCFD) method of the present invention. A difference is determined 407 between the acquired gravity data 401 and the gravity data potential fields' response due to the geophysical model 405. If the difference 407 is outside of a selected minimum range 409, an inversion process 410 is implemented, for example through applying a constrained nonlinear inversion using a Gauss-Newton approach as outlined in the '204 application. The model 405 is parameterized using appropriate basis functions; model parameters are inverted for simultaneously; soft bounds are imposed on the solution; the minimization problem may be solved with an interior-point method. The non-uniqueness of the underdetermined problem is addressed by minimizing one or more model objective functions, for example, by imposing geological constraints based on apriori knowledge or interpretations. In this manner, the estimated gravity potential fields' response 405 is compared with measured gravity data 401 and iterated through 410 until the model differences 407 are within selected limits 409.

Two other embodiments of the present invention have application to address prior art data noise problems with the use of gravity tensor technology. One of the major problems with tensor methods is the typically high noise level associated with most tensor surveys. In fact, in many cases the noise may swamp the signals believed to be attributable to geologic structures. Before the tensor data can be used for exploration purposes, a process must be applied to try to extract the signal from the measured tensor data.

Embodiments of the present invention for application to noise problems may incorporate one or both of two techniques that may be applied separately or in tandem to drastically reduce the level of noise in all five tensor channels. These two techniques are the 'Laplace's Equation' method and the 'equivalent source' method. Barely interpretable datasets can be converted to datasets that may be almost 'geologic' in nature.

The method based on a solution of Laplace's equation works very well for merging the low spatial frequencies measured with a standard gravimeter with the entire spatial frequency spectrum measured with full gravity tensors measurements. The Laplace's equation method utilizes a solution on an arbitrary surface not intersecting the region containing the sources causing the gravity and tensor response. As an example, the method may use a 2D half-cosine transform-like function for the x and y dependence, along with the exponential function for the z dependence. Thus, the gravitation potential V(x,y,z), can be represented as a series of products of the two functions with coefficients $A_{mn}$ where m and n refer to the spatial wave numbers Kx, Ky and Kz in the x, y and z direction respectively. Kz becomes a function of Kx and Ky when this series is made to be a solution to Laplace's equation for V(x,y,z). The utility of this form of V(x,y,z) is that it can be easily included in a linear-inverse scheme to investigate the true signal in a set of gravity and gravity tensor measurements. Since the gravity field and tensor can be derived from the gravitational potential V(x,y,z), the $A_{mn}$'s can thus be estimated by fitting the observed data using various linear-inversion algorithms. This allows the components of all data channels that satisfy Laplace's equation simultaneously to be isolated from the noise. Noise may be defined as that part of the measurements that does not pass this test. The entire survey can be condensed down to a single set of coefficients $A_{mn}$. These coefficients can be used for producing arbitrary grids of all channels. In addition, various operations can be performed such as upward and downward continuation, higher-order derivative maps, etc. Furthermore, 3D modeling such as that outlined previously can be greatly simplified using output from this process. A case in point is that the modeling program can use one channel such as the second vertical derivative tensor ($G_{zz}$), since it is directly calculated from V(x,y,z), and therefore contains information from all field measurements. This fact drastically reduces CPU time and memory requirements for doing 3D modeling. Hence, the method provides the opportunity of applying more sophisticated modeling techniques to larger survey areas while using fewer resources. One further point is that this method can be applied to randomly distributed observation locations since no FFT operations are used and the whole process is model independent.

Figure 11:
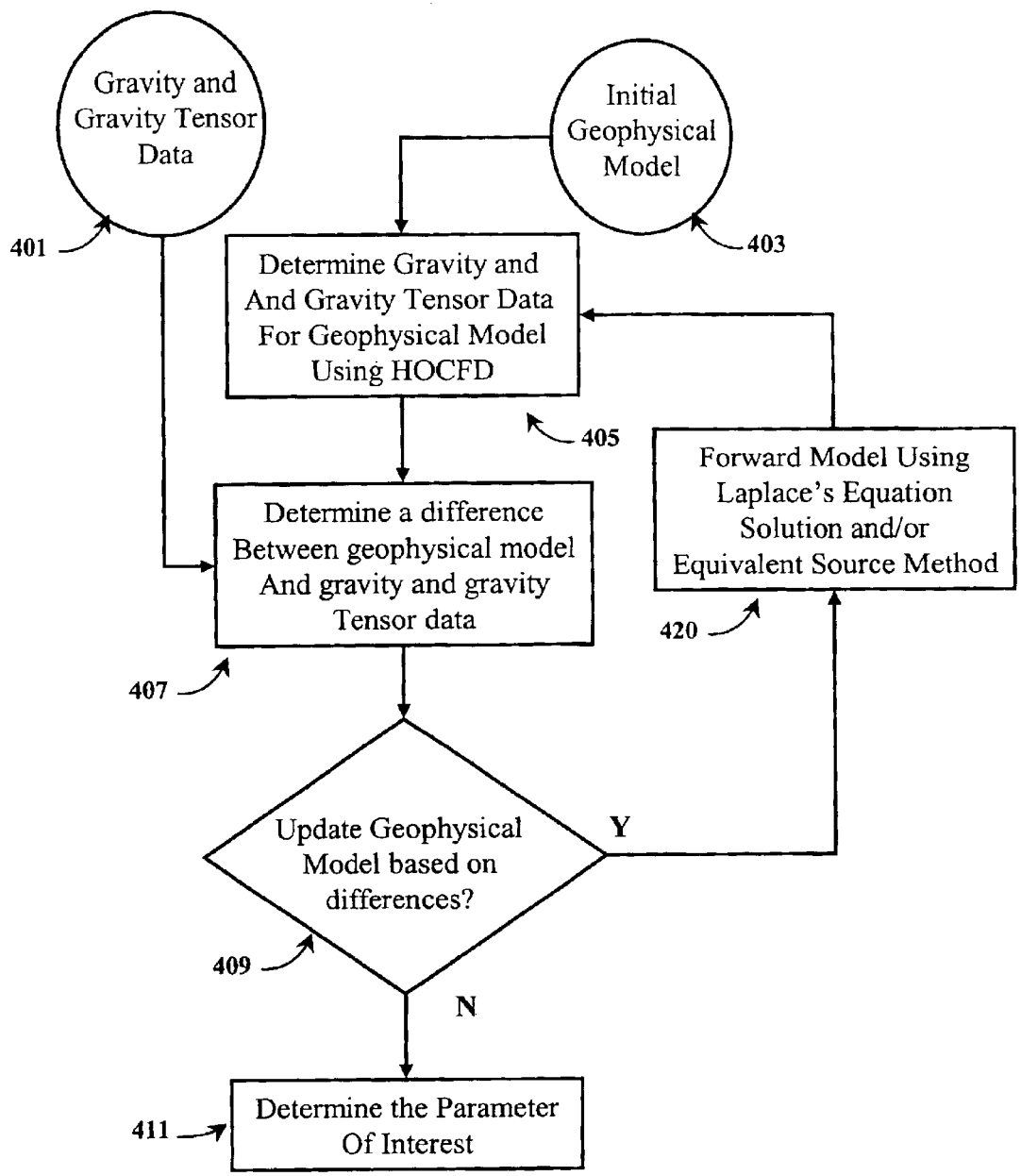
FIG. 11 is flow chart of an embodiment of the invention using Laplace's Equation and/or the Equivalent Source method.

The Laplace's Equation method embodiment is further explained with reference to the flow chart of FIG. 11. Potential fields data 401 are acquired. An initial geophysical model 403 is determined or derived from apriori knowledge and/or other available data. A model potential field as a solution to Laplace's Equation method 405 is determined from the initial geophysical model 403, using for example, half-cosine function transforms in x and y, and an z variable exponential function. A difference is determined 407 between the acquired potential fields data 401 and the potential fields response due to the geophysical model 405. If the difference 407 is outside of a selected minimum range 409, a forward modeling process 420 is implemented by applying a Laplace's Equation solution approach and/or an Equivalent Source method. In this manner, the estimated or modeled potential fields response 405 is compared with measured potential fields data 401 and iterated 410 until the model differences 407 are within selected limits 409.

Another method that may be used for data noise reduction is based on equivalent-source modeling. Equivalent-source modeling deals with the formation of an infinitely thin layer of spatially varying mass between the source(s) believed to be responsible for the measured gravity and gravity tensor fields, and the observation positions. In the case of marine surveys this layer of surface mass may be chosen to be coincident with the bathymetric surface. The method of forward modeling has been outlined previously. The main difference is that the surface density is set as the product of a two-dimensional surface density distribution function, Ms(x',y'), and a delta function with the argument (z'-Z(x', y')), where Z(x',y') is the bathymetry. This results in an analytical integration of z', thus leaving a numerical 2D integration over x' and y' for the model field calculations. In a linear inversion program, Ms(x',y') can be determined that best models the measured tensors and gravity simultaneously. Ms(x',y') is parameterized analogously to the base of salt as previously disclosed. Just as for the Laplace equation solution method, the residual fields that cannot be modeled are considered noise, and this method also can utilize randomly distributed observation points. The Laplace equation solution method and the equivalent source modeling method may be used in tandem.

The Equivalent Source method is further explained with reference to the flow chart of FIG. 11. Potential fields data 401 are acquired. An initial geophysical model 403 is determined or derived from apriori knowledge and/or other available data. A model potential field as a solution to the Equivalent Source method 405 is determined from the initial geophysical model 403, using for example, surface density set as the product of a two-dimensional surface density distribution function, Ms(x',y'), and a delta function with the argument (z'-Z(x',y')), where Z(x',y') is the bathymetry. A difference is then determined 407 between the acquired potential fields data 401 and the potential fields response determined from the geophysical model 405. If the difference 407 is outside of a selected minimum range 409, a forward modeling process 420 is implemented by applying an Equivalent Source method. In this manner, the estimated or modeled potential fields response 405 is compared with measured potential fields data 401 and iterated 410 until the model differences 407 are within selected limits 409.

Figure 12:
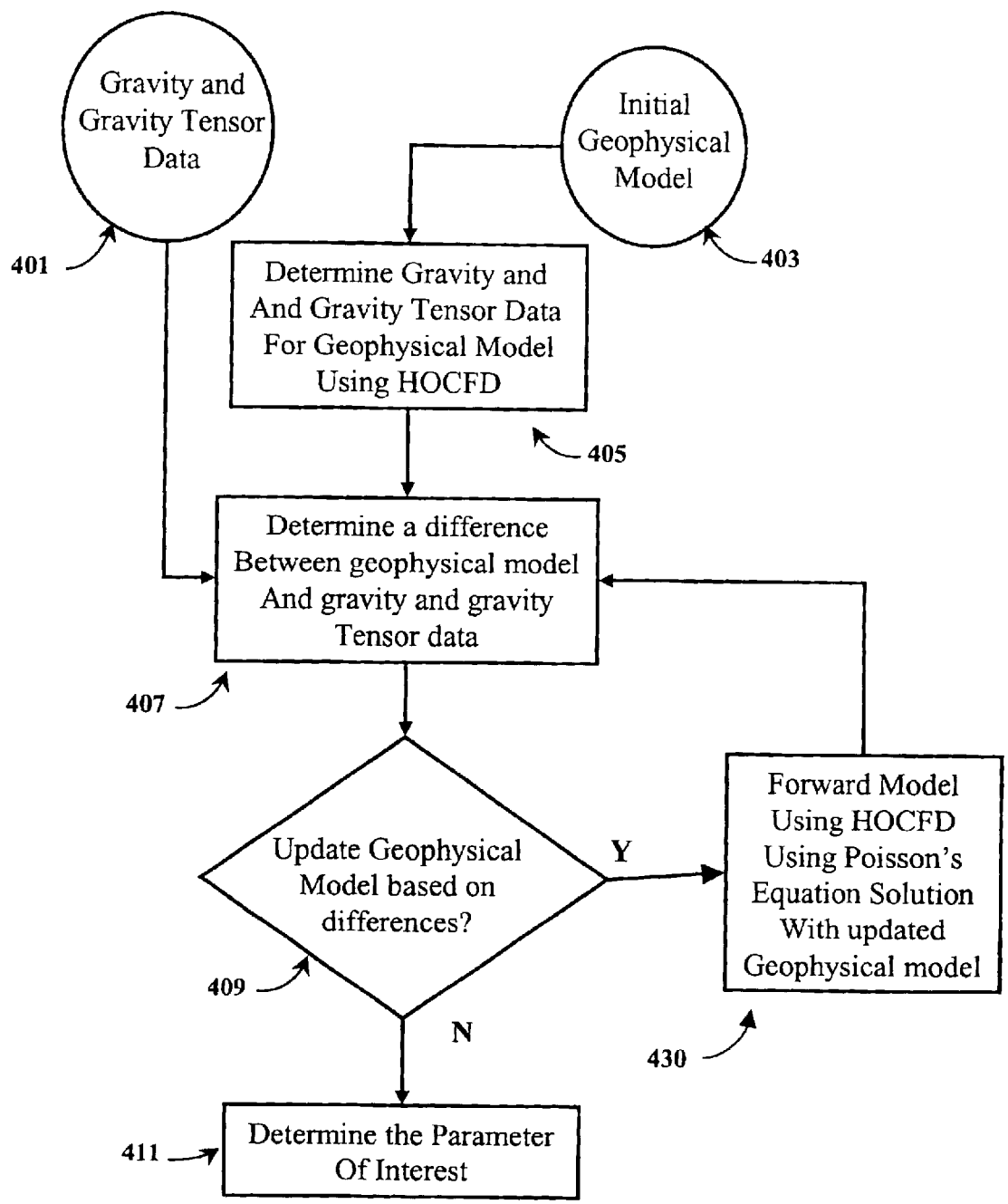
FIG. 12 is flow chart of an embodiment of the invention using a Poisson's Equation method solution.

A preferred embodiment of the method of the present invention is further illustrated with reference to the flow chart of FIG. 12. Potential fields data 401 are acquired. An initial geophysical model 403 is determined or derived from apriori knowledge and/or other available data using HOCFD. A model gravity data potential field as a solution to the Poisson equation 405 is determined from the initial geophysical model 403, using for example, data values derived a locations equivalent to the potential fields' data 401. A difference is then determined 407 between the acquired potential fields data 401 and the potential fields response determined from the geophysical model using HOCFD 405. If the difference 407 is outside of a selected minimum range 409, a forward modeling process 430 is implemented by applying any inversion method wherein the modeled gravity and/or gravity tensor data are inverted to obtain values consistent with the structures of the initial geophysical model 401, or the structures and their density distributions may be altered as outlined in embodiments above. In this manner, the estimated or modeled potential fields response 405 is compared with measured potential fields data 401 and iterated 410 until the model differences 407 are within selected limits 409.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for determining a parameter of interest of a region of interest of the earth, the method comprising:

(a) measuring at least one component of gravity data at a plurality of locations over a region of interest including a subterranean formation of interest;

(b) determining an initial geophysical model of the region of interest including the subterranean formation of interest;

(c) for said model, estimating a value of the gravity data at said plurality of locations using a High Order Compact Finite Difference method;

(d) determining a difference between said estimated value and said measured value of said measurements at said plurality of locations;

(e) updating the geophysical model of the region based on said difference;

(f) iteratively repeating steps c–e until said difference is less than a predetermined value; and (g) using said model to determine the parameter of interest.

2. The method of claim 1 wherein said parameter of interest is selected from: i) an upward continued gravity field, ii) a downward continued gravity field, iii) an anomalous subsurface object, iii) a lower boundary of a subterranean formation, iv) a thickness of a subterranean formation, v) a density of the subterranean formation, vi) a magnetic susceptibility of the subterranean formation, vii) a volume of the subterranean formation, viii) overburden stress in the region of interest, ix) effective stress in the region of interest, x) formation fluid pressure in the region of interest, xi) overburden stress below a subterranean formation of interest, xii) effective stress below a subterranean formation of interest, and xiii) formation fluid pressure below a subterranean formation of interest.

3. The method of claim 1 wherein estimating a value of the gravity data at said plurality of locations using a High Order Compact Finite Difference method includes a conjugate gradient method.

4. The method of claim 1 wherein estimating a value of the gravity data at said plurality of locations using a High Order Compact Finite Difference method includes estimating at least one model observation point inside the volume of said region of interest of the earth.

5. The method of claim 1 wherein the subterranean formation of interest is one of the group consisting of (i) a salt body, (ii) a shale diapir, (iii) a volcanic flow, (iv) an intrusive igneous body, and, (v) an extrusive igneous body.

6. The method of claim 1 wherein the at least one component of gravity data is a gravity component, the method further comprising applying to the at least one component of the gravity data for at least one of (i) a latitude correction, (ii) a free air correction, (iii) a fixed density Bouguer correction, (iv) a variable density Bouguer correction, (v) Eotvos correction, and (vi) datum correction.

7. The method of claim 1 wherein the model is selected from (i) a 2D model, (ii) a 2.5D model, (iii) a 2.75D model, and (iv) a 3-D model.

8. The method of claim 1 further comprising incorporating in the model at least one of (i) land topography, (ii) marine sea surface, and (iii) water bottom bathymetry.

9. The method of claim 1 wherein density of the subterranean formation in the determined geophysical model is at least one of (i) a fixed density, (ii) a laterally varying density, and (iii) a vertically varying density.

10. The method of claim 1 wherein determining the initial geophysical model further comprises acquiring and processing seismic data over the region of interest and using the seismic data to derive the geophysical model therefrom.

11. The method of claim 10 wherein processing the seismic data further comprises:

i) determining seismic velocities in the region from the acquired seismic data; and ii) using an empirical relation between seismic velocities and densities in determining a geophysical model of density.

12. A method for processing gravity and gravity tensor data, the method comprising:

(a) measuring at least one component of gravity and gravity tensor data at a plurality of locations over a region of interest including a subterranean formation of interest;

(b) determining an initial geophysical model of the region including the subterranean formation of interest;

(c) for said model, estimating a value of said at least one component of geophysical tensor data at said plurality of locations based on a forward model of gravity data using a High Order Compact Finite Difference method;

(d) determining a difference between said estimated value and said measured value of said measurements at said plurality of locations;

(e) updating the forward model based on said difference;

(f) iteratively repeating steps c–e until said difference is less than a predetermined value; and (g) using said updated forward model to determine at least one component of gravity and gravity tensor data at a plurality of locations.

13. The method of claim 12 wherein the subterranean formation of interest is one of the group consisting of (i) a salt body, (ii) a shale diapir, (iii) a volcanic flow, (iv) an intrusive igneous body, and, (v) an extrusive igneous body.

14. The method of claim 12 wherein the at least one component of gravity and gravity tensor data comprises at least two components of gravity and gravity tensor data, and the method further comprises filtering the at least two components to give filtered data components that are consistent with Poisson's equation.

15. The method of claim 12 wherein the method further comprises applying to the at least one component of gravity and gravity tensor data at least one of (i) a latitude correction, (ii) a free air correction, (iii) a fixed density Bouguer correction, (iv) a variable density Bouguer correction, (v) Eotvos correction, and (vi) datum correction.

16. The method of claim 12 wherein the model is selected from (i) a 2D model, (ii) a 2.5D model, (iii) a 2.75D model, and (iv) a 3-D model.

17. The method of claim 12 further comprising incorporating in the initial geophysical model at least one of (i) land topography, (ii) marine sea surface, and (iii) water bottom bathymetry.

18. The method of claim 12 wherein density of the initial geophysical model is at least one of (i) a fixed density, (ii) a laterally varying density, and (iii) a vertically varying density.

19. The method of claim 12 further comprising inverting at least two components of gravity and gravity tensor data so that said inverted components satisfy Poisson's equation simultaneously.

20. The method of claim 19 wherein iteratively repeating steps (c)–(e) of claim 1 further comprises solving for the gravity and gravity tensor data simultaneously.

* * * * *